US012593145B2

(12) United States Patent (10) Patent No.: US 12,593,145 B2

Watanabe (45) Date of Patent: Mar. 31, 2026

(54) IMAGING ELEMENT, CONTROL METHOD, AND STORAGE MEDIUM

(71) Applicant: CANON KABUSHIKI KAISHA, Tokyo (JP)

(72) Inventor: Shinobu Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 30 days.

(21) Appl. No.: 18/761,708

(22) Filed: Jul. 2, 2024

(65) Prior Publication Data

US 2025/0024166 A1 Jan. 16, 2025

(30) Foreign Application Priority Data

Jul. 11, 2023 (JP) ................................. 2023-113470
Apr. 24, 2024 (JP) ................................. 2024-070471

(51) Int. Cl.
*H04N 25/532* (2023.01)
*H04N 25/772* (2023.01)

(52) U.S. Cl.
CPC ......... *H04N 25/532* (2023.01); *H04N 25/772* (2023.01)

(58) Field of Classification Search
None
See application file for complete search history.

(56) References Cited

U.S. PATENT DOCUMENTS

2015/0341582 A1* 11/2015 Sakaguchi ........... H04N 25/771
                                                  348/301
2022/0021837 A1* 1/2022 Zhu ........................ H04N 25/47
2022/0247964 A1* 8/2022 Kobayashi ............. H04N 25/79

FOREIGN PATENT DOCUMENTS

JP        2013138406 A    7/2013
JP        2017108066 A    6/2017

* cited by examiner

*Primary Examiner* — Mark T Monk
(74) *Attorney, Agent, or Firm* — Cowan, Liebowitz & Latman, P.C.

(57) ABSTRACT

An imaging element includes a plurality of pixels each having a photoelectric conversion unit and a charge holding unit configured to accumulate charges generated in the photoelectric conversion unit, a voltage holding unit configured to hold a voltage signal according to the charges of the charge holding unit, a source follower unit configured to transfer the voltage signal to the voltage holding unit, a current source configured to drive the source follower unit, and a current source control unit configured to control the current source, wherein the current source control unit transfers the charges generated in the photoelectric conversion unit to the charge holding unit all at once, and the source follower unit and the current source are sequentially connected to sequentially transfer the voltage signal according to the charges accumulated in the charge holding unit to the voltage holding unit.

9 Claims, 25 Drawing Sheets

FIG. 13

IMAGING ELEMENT, CONTROL METHOD, AND STORAGE MEDIUM

BACKGROUND OF THE INVENTION

Field of the Invention

The present invention relates to an imaging element, a control method, a storage medium, and the like.

Description of the Related Art

For example, in a CMOS image sensor, there is proposed a so-called global electronic shutter that matches signal charge accumulation periods (exposure periods) among a plurality of pixels. The global electronic shutter has a holding unit that holds signals for each of the pixels, starts accumulation for all pixels at the same time, and simultaneously transfers charges to the holding unit when the accumulation ends.

An imaging device described in Japanese Patent Laid-Open No. 2017-108066 enables an global electronic shutter operation using a plurality of pixels that perform photoelectric conversion and charge-voltage conversion to output voltages and a plurality of voltage holding capacitors that hold the voltages output by each of the pixels.

However, Japanese Patent Laid-Open No. 2017-108066 has a problem in that when signals are transferred from a photoelectric conversion unit to the voltage holding capacitor all at once, source follower current sources of all pixels operate simultaneously, resulting in an increase in peak power.

On the other hand, in Japanese Patent Laid Open No. 2013-138406, pixels that share a charge-voltage conversion unit (floating diffusion) are sequentially transferred to a voltage holding capacitor. Thus, although it is possible to reduce the peak power, there is a problem that globality will be lost.

SUMMARY OF THE INVENTION

An imaging element in an embodiment of the present invention includes a plurality of pixels each having a photoelectric conversion unit and a charge holding unit configured to accumulate charges generated in the photoelectric conversion unit, a voltage holding unit configured to hold a voltage signal according to the charges of the charge holding unit, a source follower unit configured to transfer the voltage signal to the voltage holding unit, a current source configured to drive the source follower unit, and at least one processor or circuit configured to function as a current source control unit configured to control the current source, wherein the current source control unit transfers the charges generated in the photoelectric conversion unit to the charge holding unit all at once, and the source follower unit and the current source are sequentially connected to sequentially transfer the voltage signal according to the charges accumulated in the charge holding unit to the voltage holding unit.

Further features of the present invention will become apparent from the following description of embodiments with reference to the attached drawings.

BRIEF DESCRIPTION OF THE DRAWINGS

FIG. 13 is a schematic diagram showing a configuration example of a non-light receiving surface of a PD substrate 21 of an imaging element 2 in a third embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

[Imaging Device, Element]

Figure 1:
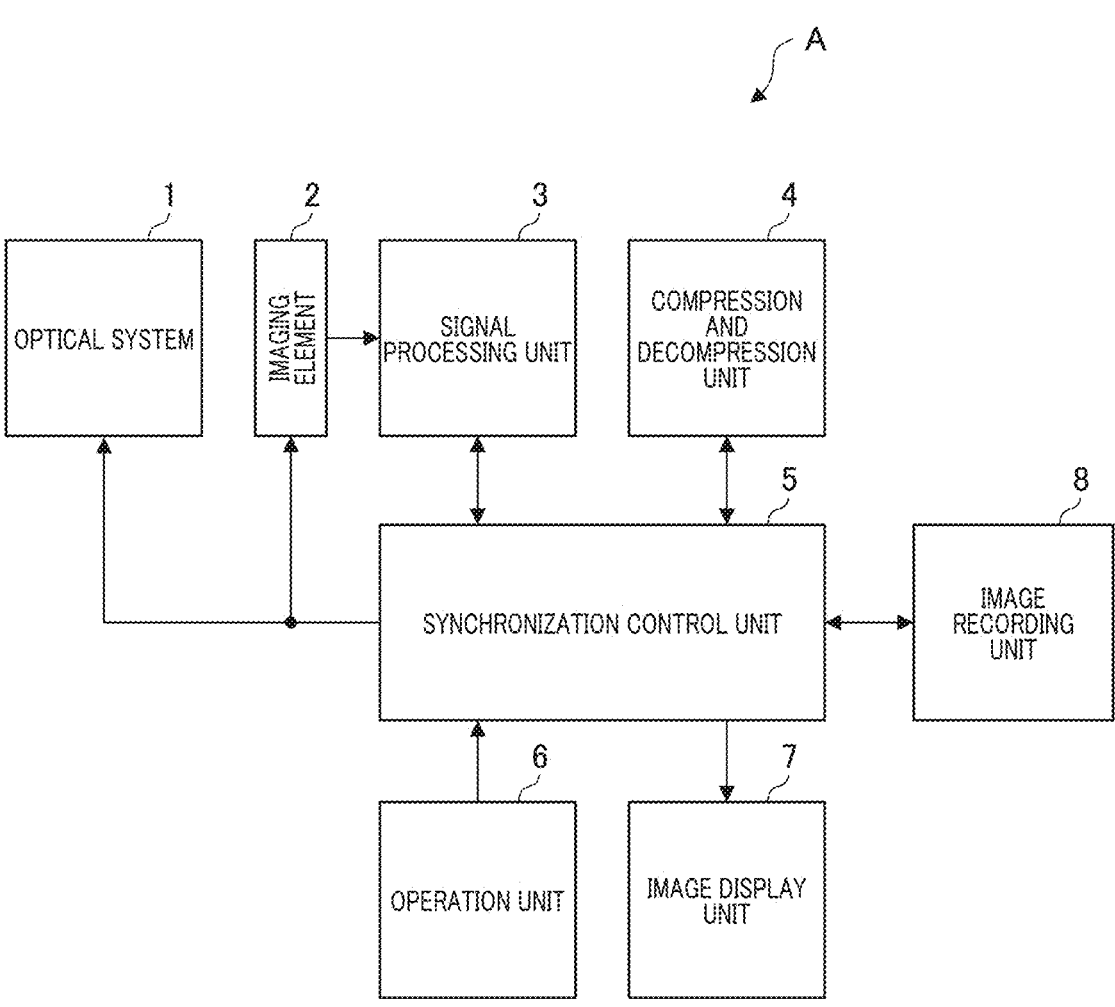
FIG. 1 is a block diagram showing a configuration example of an imaging device A according to a first embodiment of the present invention.

FIG. 1 is a diagram showing a configuration example of an imaging device A according to a first embodiment of the present invention. Some of functional blocks shown in FIG. 1 are realized by causing a CPU (not shown) included in the imaging device A as a computer to execute a computer program stored in a memory (not shown) as a storage medium.

However, some or all of them may be realized by hardware. As the hardware, a dedicated circuit (ASIC), a processor (a reconfigurable processor, DSP), and the like can be used. Moreover, the respective functional blocks shown in FIG. 1 do not need to be built into the same housing and may be configured of separate devices connected to each other via signal paths.

The imaging device A is applicable to a digital still camera, a digital video camera, an in-vehicle camera, a surveillance camera, a smartphone, and the like. The imaging device A includes an imaging optical system 1, an imaging element 2, a signal processing unit 3, a compression and decompression unit 4, a synchronization control unit 5, an operation unit 6, an image display unit 7, and an image recording unit 8.

The imaging optical system 1 includes a lens, a lens driving mechanism, a mechanical shutter mechanism, an aperture mechanism, and the like. The movable parts among them are driven based on control signals from the synchronization control unit 5.

The imaging element 2 is an XY address type complementary metal oxide semiconductor (CMOS) image sensor and performs an imaging operation based on a control signal from the synchronization control unit 5. Further, an imaging signal is digitized by an AD conversion circuit included in the imaging element 2 and output to the signal processing unit 3 as an image signal. The detailed configuration of the imaging element 2 will be described below.

The signal processing unit 3 performs image processing such as noise correction and white balance processing on the digitized image signal input from the imaging element 2 under the control of the synchronization control unit 5. Further, the signal processing unit 3 generates control information such as auto focus (AF) and auto exposure (AE). The image signal subjected to image processing in the signal processing unit 3 and the control information are output to the synchronization control unit 5.

The compression and decompression unit 4 operates under the control of the synchronization control unit 5, and performs compression encoding processing on the image signal or performs decompression decoding processing on encoded data of a still image. Further, compression encoding and decompression decoding processing of a moving image may be performed.

The synchronization control unit 5 is a microcontroller including, for example, a central processing unit (CPU), a read only memory (ROM), and a random access memory (RAM).

The synchronization control unit 5 centrally controls each unit of the imaging device A by executing a computer program stored in a ROM or the like. The operation unit 6 is configured of various operation members such as a shutter release button and outputs a control signal according to an input operation by a user to the synchronization control unit 5. Examples of the input operation by the user include settings for recording modes of still images, moving images, and the like, and exposure control (an aperture, a shutter speed, ISO sensitivity), and the like.

The image display unit 7 supplies an image signal to a display device such as a liquid crystal display (LCD) to display an image. The image recording unit 8 is connected to, for example, a portable recording medium, and stores compressed and encoded image data files.

Figure 2:
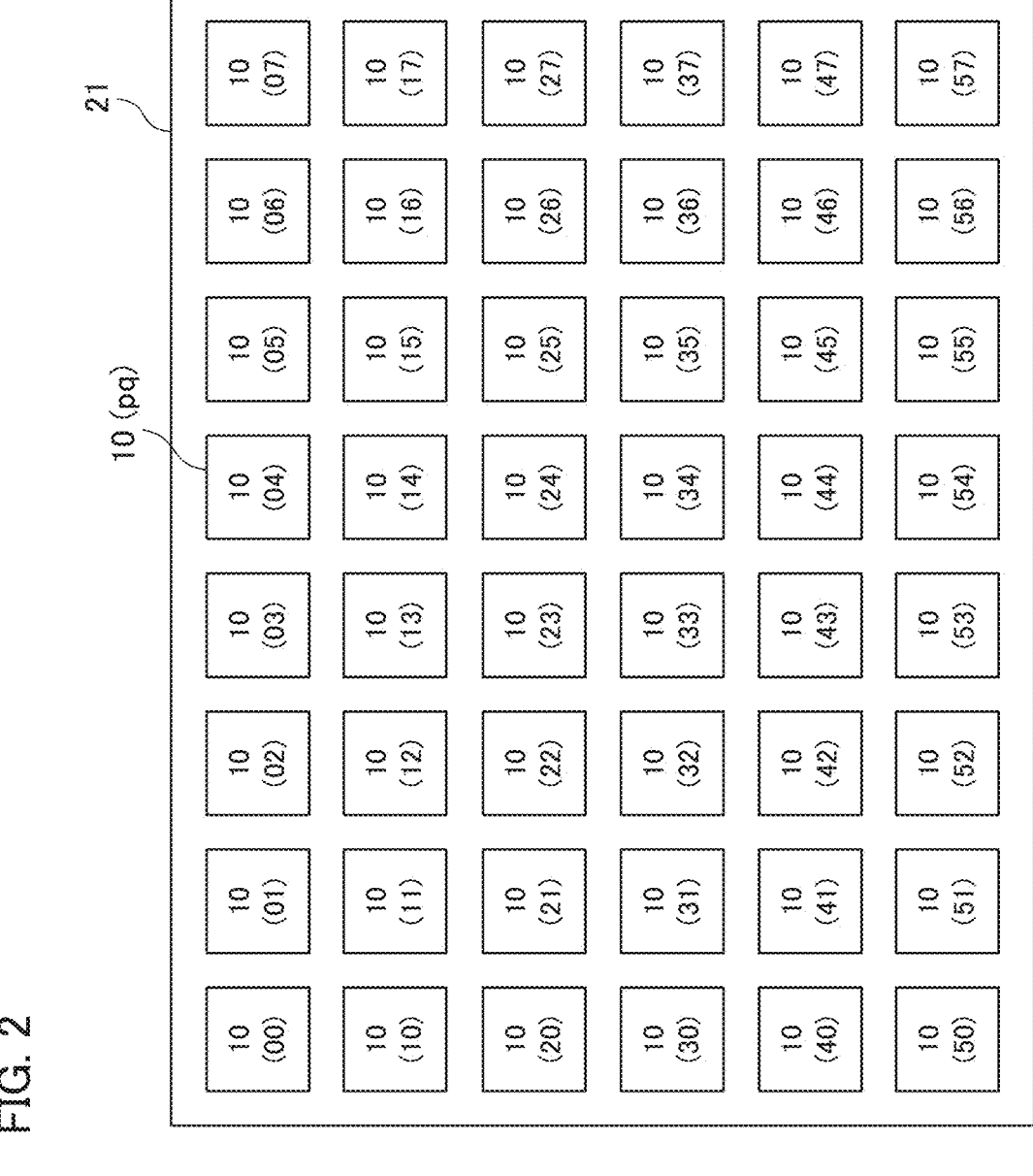
FIG. 2 is a schematic diagram showing a configuration example of a light receiving surface of a PD substrate 21 of an imaging element 2.

Next, a circuit configuration of the imaging element 2 will be described using FIGS. 2 to 5. FIG. 2 is a schematic diagram showing a configuration example of a light receiving surface of a PD substrate 21 of the imaging element 2. In FIG. 2, a PD 10(pq) represents a photodiode located in a p-th row and a q-th column.

Although FIG. 2 shows an arrangement example of pixels in 6 rows and 8 columns, in reality, tens of millions of pixels or more are disposed in a two-dimensional matrix. The imaging element 2 includes a PD substrate 21 having a plurality of PDs 10. The PD 10 functions as a photoelectric conversion unit that generates charges according to incident light.

Figure 3:
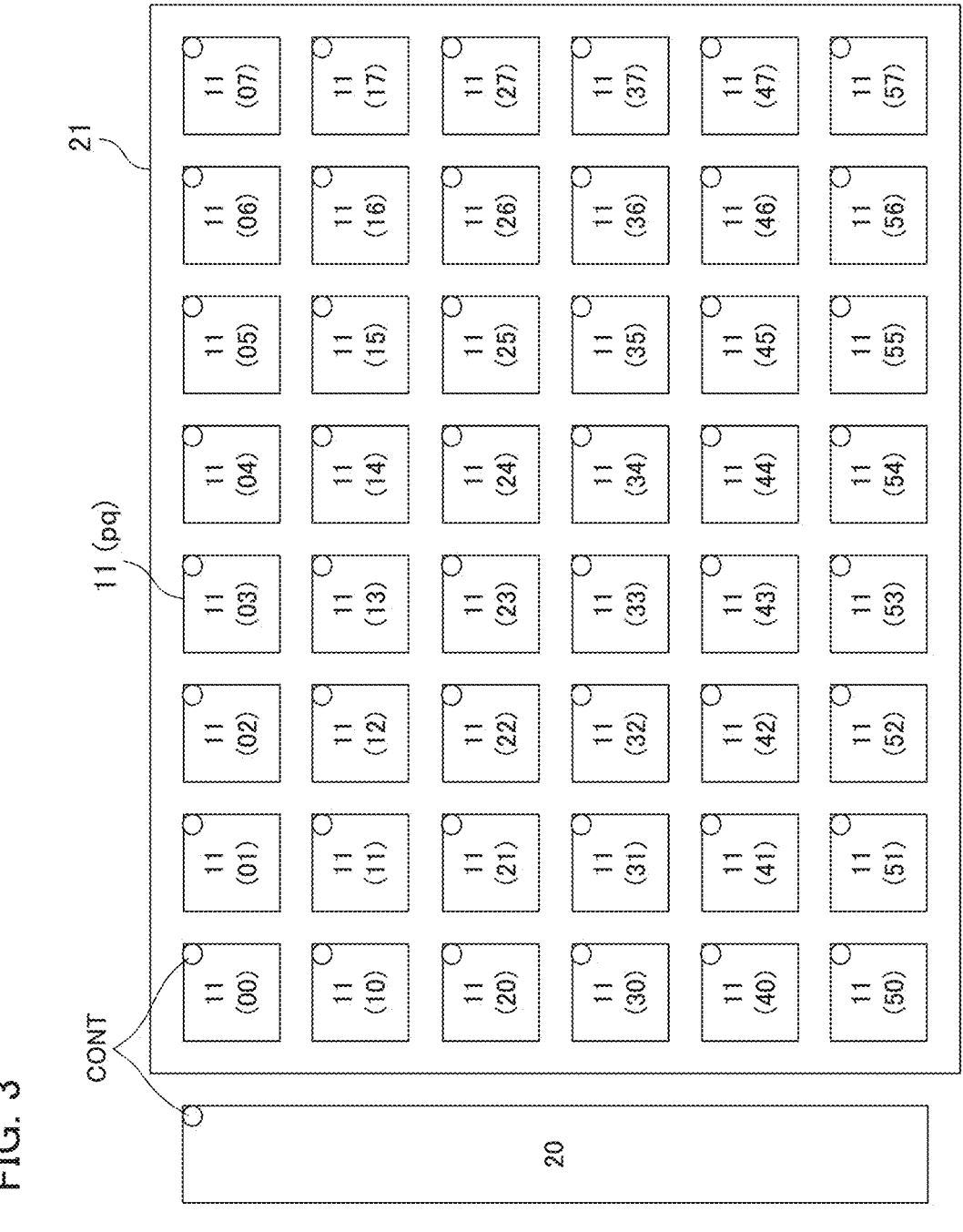
FIG. 3 is a schematic diagram showing a configuration example of a non-light receiving surface of the PD substrate 21 of the imaging element 2 and is a diagram seen from the light receiving surface side.

FIG. 3 is a schematic diagram showing a configuration example of a non-light receiving surface of the PD substrate 21 of the imaging element 2 and is a diagram seen from the light receiving surface side. On the non-light receiving surface, pixel circuits 11 (pq) are arranged in a two-dimensional manner corresponding to the PDs 10 (pq).

The PD 10 and the pixel circuit 11 are collectively called a pixel. That is, each of pixels includes the PD 10 (pq) and the pixel circuit 11 (pq). A voltage signal output from the pixel circuit 11 (pq) can be transferred to a laminated substrate 22 via an electrical contact CONT for each pixel.

The contact CONT is connected to a vertical scanning circuit 20 of the laminated substrate 22 and outputs a control signal to the PD 10 and the like on the PD substrate 21 as well. Thus, a global electronic shutter operation which will be described below can be realized.

For example, the PD substrate 21 is an N-type silicon substrate, the PD 10 is an N-type semiconductor region, and electrons among electron-hole pairs generated when light is received are accumulated. A driving timing will be described in detail after an equivalent circuit diagram including the pixel circuit 11 is described.

Figure 4:
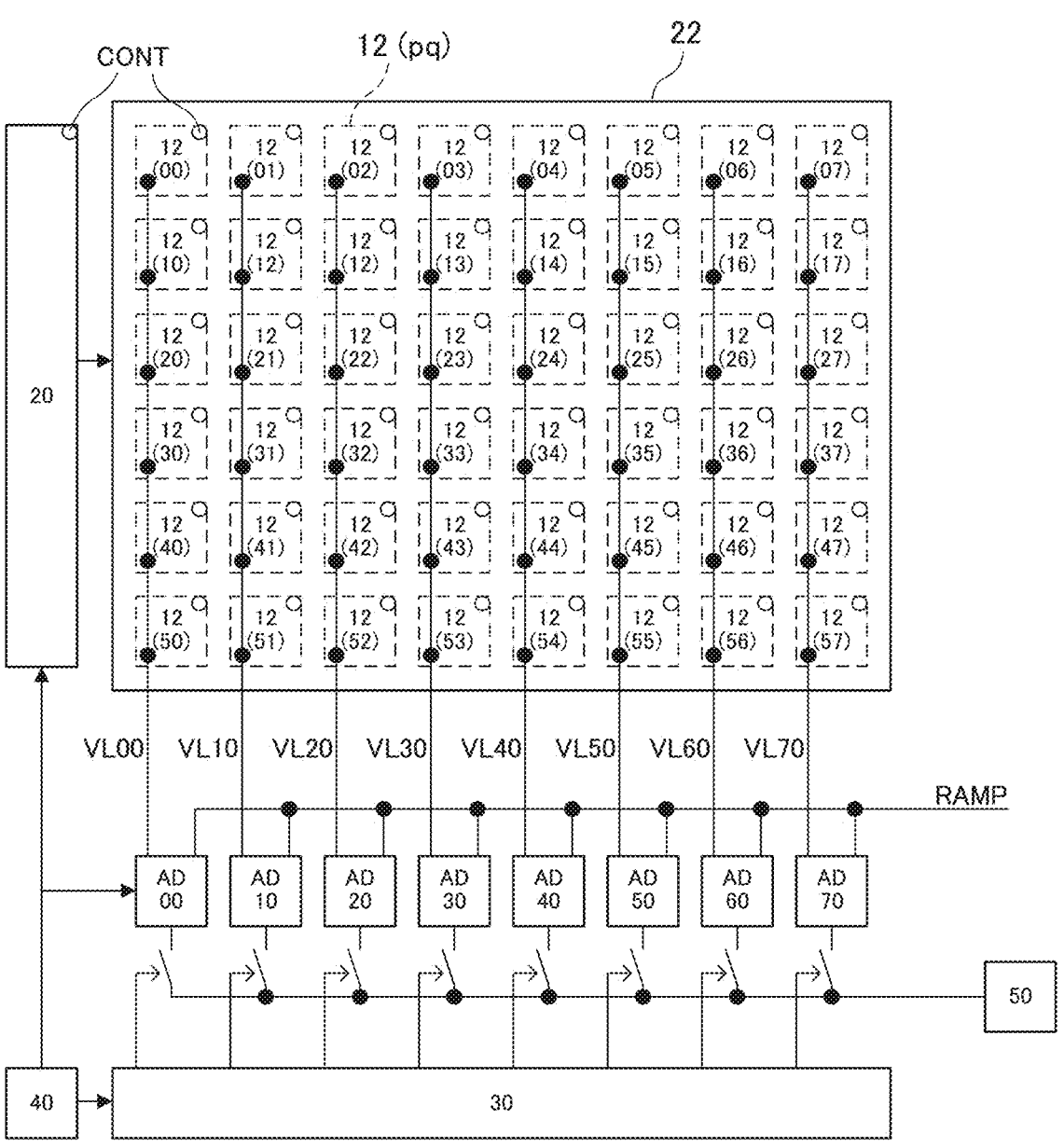
FIG. 4 is a schematic diagram showing a configuration example of a laminated substrate 22 of the imaging element 2.

FIG. 4 is a schematic diagram showing a configuration example of the laminated substrate 22 of the imaging element 2. Laminated circuits 12 (pq) connected to the respective pixel circuits 11 (pq) of the PD substrate 21 are arranged in a two-dimensional manner on the laminated substrate 22.

The laminated circuits 12 (*pq*) and the pixel circuits 11 (*pq*) are connected through each of the contacts CONT, and the voltage signal that is an output of the pixel circuit 11 (*pq*) can be transferred to the corresponding laminated circuit 12 (*pq*) for all pixels at once and accumulated. The accumulated voltage signals (the pixel signals) are transmitted in row order by the vertical scanning circuit 20 for scanning the laminated circuit 12 (*pq*) via a vertical output line VLq0 to an AD conversion circuit ADq0 serving as an AD conversion unit, and are subjected to AD conversion.

The AD-converted digital signals are output by a horizontal scanning circuit 30 in column order to an output unit 50 via a horizontal output line HL. The output unit 50 includes a known parallel/serial conversion unit (a P/S conversion unit).

The output unit 50 sequentially converts the digital image signals transferred to the horizontal output line HL into a high-speed serial transmission format such as low voltage differential signaling (LVDS) and outputs the converted signals. Further, correction processing for point defects and the like may be included.

A timing generation circuit 40 generates pulse signals for controlling each of the vertical scanning circuit 20, the AD conversion circuit ADq0, and the horizontal scanning circuit 30.

In the imaging device A, one vertical output line VLq0 is present in each column and is shared by all rows in the same column. Furthermore, one AD conversion circuit ADq0 is provided in each column. In order to speed up signal readout, two or more vertical output lines and AD conversion circuits may be provided in each column.

The vertical output line VLq0 and a reference signal RAMP that varies in proportion to time are input to the AD conversion circuit ADq0. A structure of the laminated circuit 12 (*pq*) for storing voltage signals, together with the PD 10 (*pq*) and the pixel circuit 11 (*pq*), will be described below using an equivalent circuit diagram.

Figure 5:
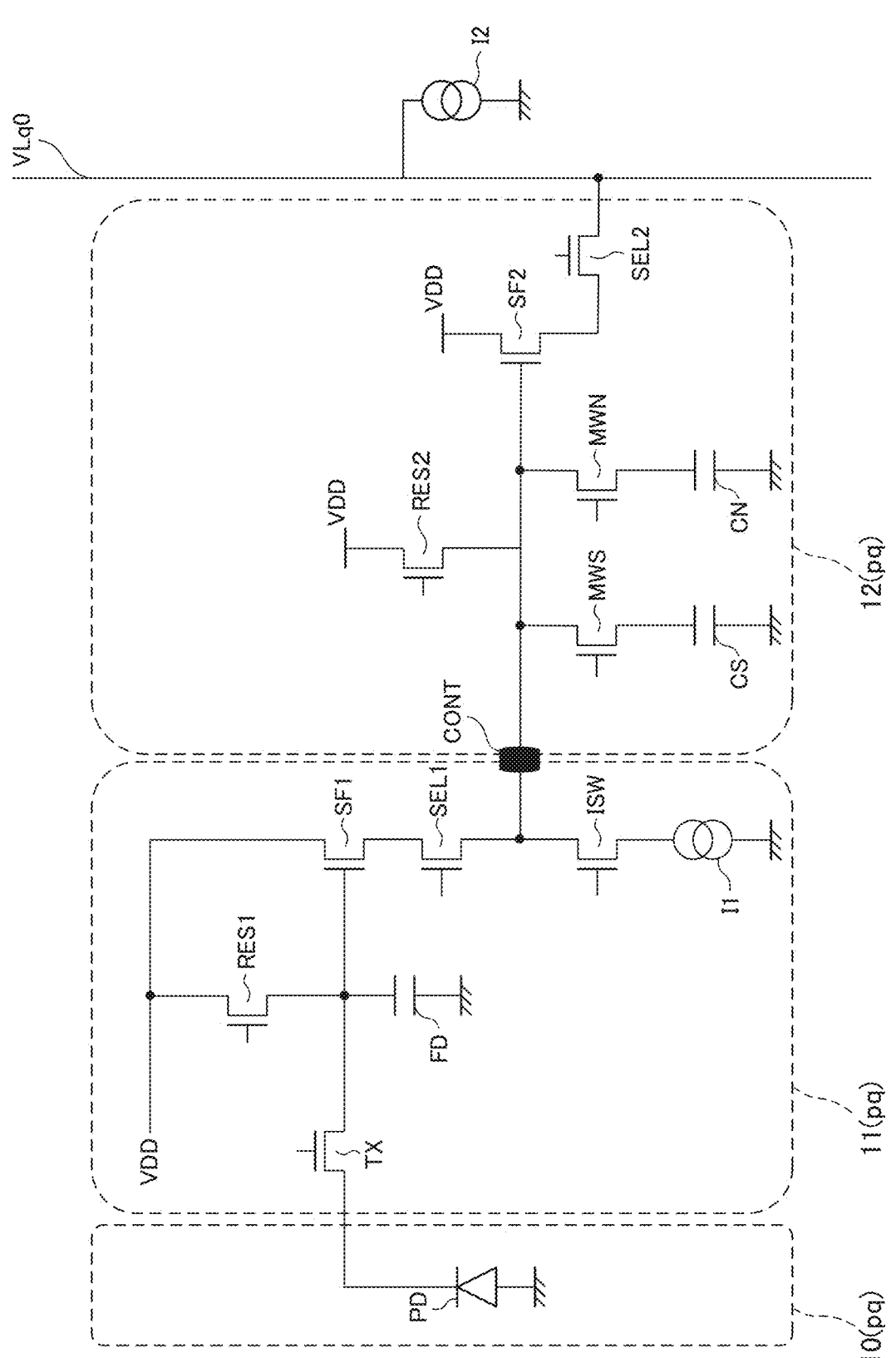
FIG. 5 is an equivalent circuit diagram showing a configuration example of a PD 10, a pixel circuit 11, and a laminated circuit 12.

FIG. 5 is an equivalent circuit diagram showing a configuration example of the PD 10, the pixel circuit 11, and the laminated circuit 12. In the PD 10 (*pq*) and the pixel circuit 11 (*pq*), charges generated in the PD 10 are transferred to an floating diffusion (FD) via a transfer transistor TX. The FD has a floating capacitance and functions as a charge holding unit that accumulates the charges generated in the PD 10.

An amplification transistor SF1 functions as a source follower unit. Furthermore, the amplification transistor SF1 constitutes a source follower circuit including an FD and a current source I1. A reset transistor RES1 resets the FD with a predetermined voltage VDD. A selection transistor SEL1 is connected to a source of the amplification transistor SF1.

A current source switch ISW is connected between sources of the current source I1 and the SEL1. These transfer transistor TX, reset transistor RES1, selection transistor SEL1, and current source switch ISW can be controlled to be turned on and off by the vertical scanning circuit 20 via pulses PTX, PRES1, PSEL1, and PISW, respectively.

Among the transistors, gates of RES1, TX, and ISW can be controlled by the vertical scanning circuit 20, respectively. Then, a current of the source follower circuit is controlled by a readout operation such as charge transfer and reset of the PD 10, and switching of the current source I1.

The vertical scanning circuit 20 functions as a current source control unit that controls the current source I1. Further, a source of the selection transistor SEL1 is connected to the laminated circuit 12 (*pq*) via the contact CONT.

The laminated circuit 12 (*pq*) includes two voltage holding capacitors CN and CS that accumulate the voltage signal of the pixel circuit 11 (*pq*). The voltage holding capacitors CN and CS function as voltage holding units. As the capacitance of each of the voltage holding capacitors CN and CS becomes larger, kTC noise according to a reset operation can be reduced.

The PD and the voltage holding capacitors CN and CS are provided for each pixel. The voltage holding capacitor CN holds a voltage signal (hereinafter, referred to as an N signal) according to the charge after the FD of the pixel circuit 11 (*pq*) is reset. The voltage holding capacitor CS holds a voltage of the FD (hereinafter, referred to as an S signal) that has decreased in accordance with a signal charge of the PD 10.

For the voltage holding capacitors CN and CS, capacitive elements using a trench structure and having an expanded equal surface area may be used. Further, a high capacitive element formed between lines may be used at a location, at which a high dielectric constant material is used, between wiring layers of the laminated substrate 22. Furthermore, a transistor gate oxide film of the laminated substrate 22 may be used in part.

The two voltage holding capacitors CN and CS are provided with memory writing transistors MWN and MWS for writing voltage signals, respectively. The voltage holding capacitors CN and CS are connected to a gate of an amplification transistor SF2 and constitute a source follower circuit including a current source 12. The Amplification transistor SF2 functions as a source follower unit.

A reset transistor RES2 resets the voltage holding capacitors CN and CS into a predetermined voltage VDD. A selection transistor SEL2 is connected to a source of SF2 and selectively transmits a voltage signal to the vertical output line VLq0.

The memory writing transistors MWN and MWS, the reset transistor RES2, and the selection transistor SEL2 can be controlled to be turned on or off by the vertical scanning circuit 20 via pulses PMWN, PMWS, PRES2, and PSEL2, respectively. Therefore, a readout operation such as transferring and resetting of the voltage signal can be controlled by the pulses.

[Imaging Method]

Next, a method of driving the imaging element 2 will be described. In the first embodiment, driving in which globality can be maintained while peak power of the imaging element 2 is reduced is performed.

Figure 19:
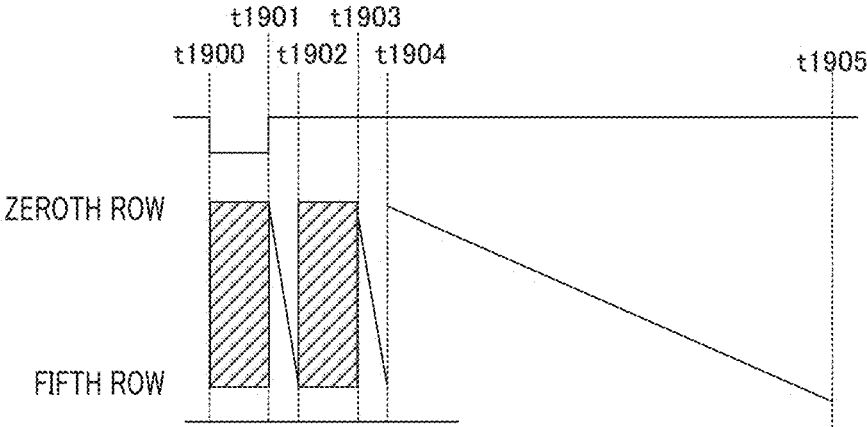
FIG. 19 is a timing chart showing an operation example when a zeroth row to a fifth row of the imaging element 2 are sequentially read out.
Figure 20:
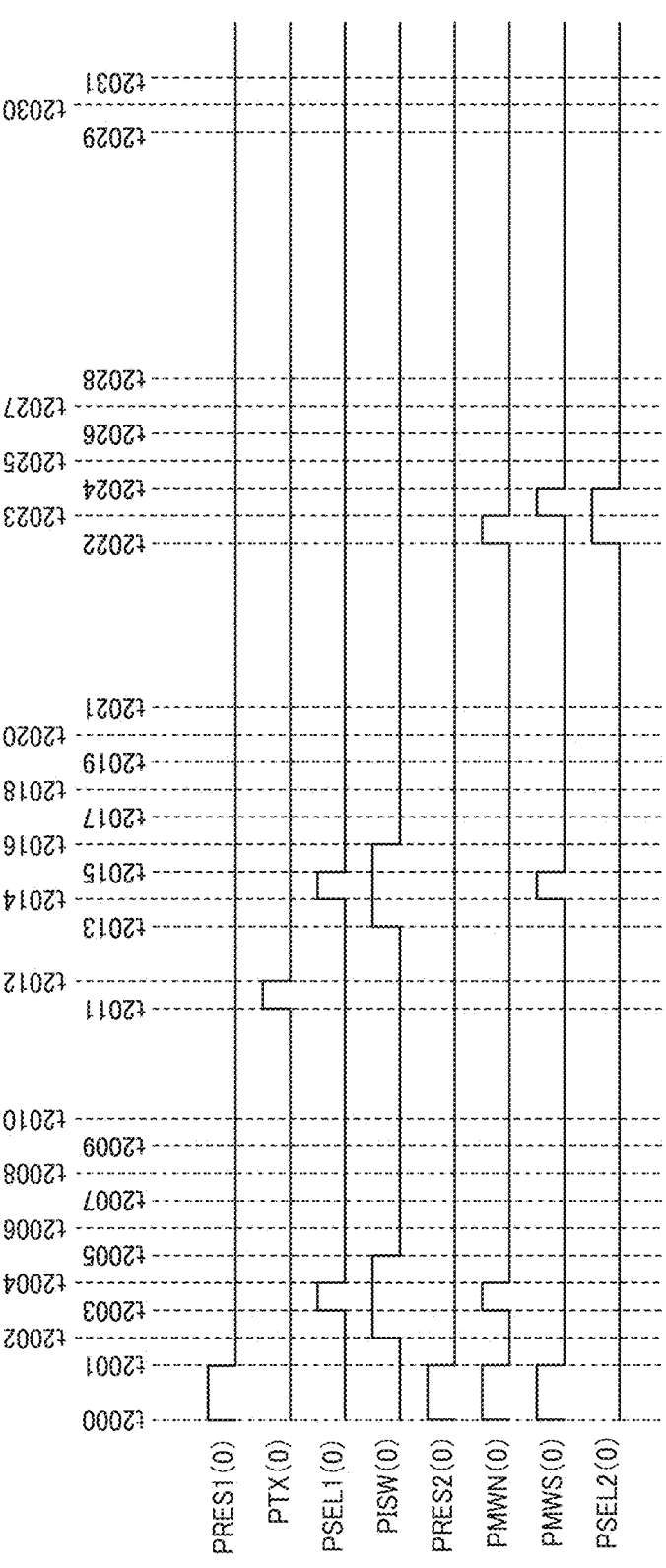
FIG. 20 is a timing chart showing an example of a driving method related to a fourth embodiment of the imaging element 2.
Figure 21:
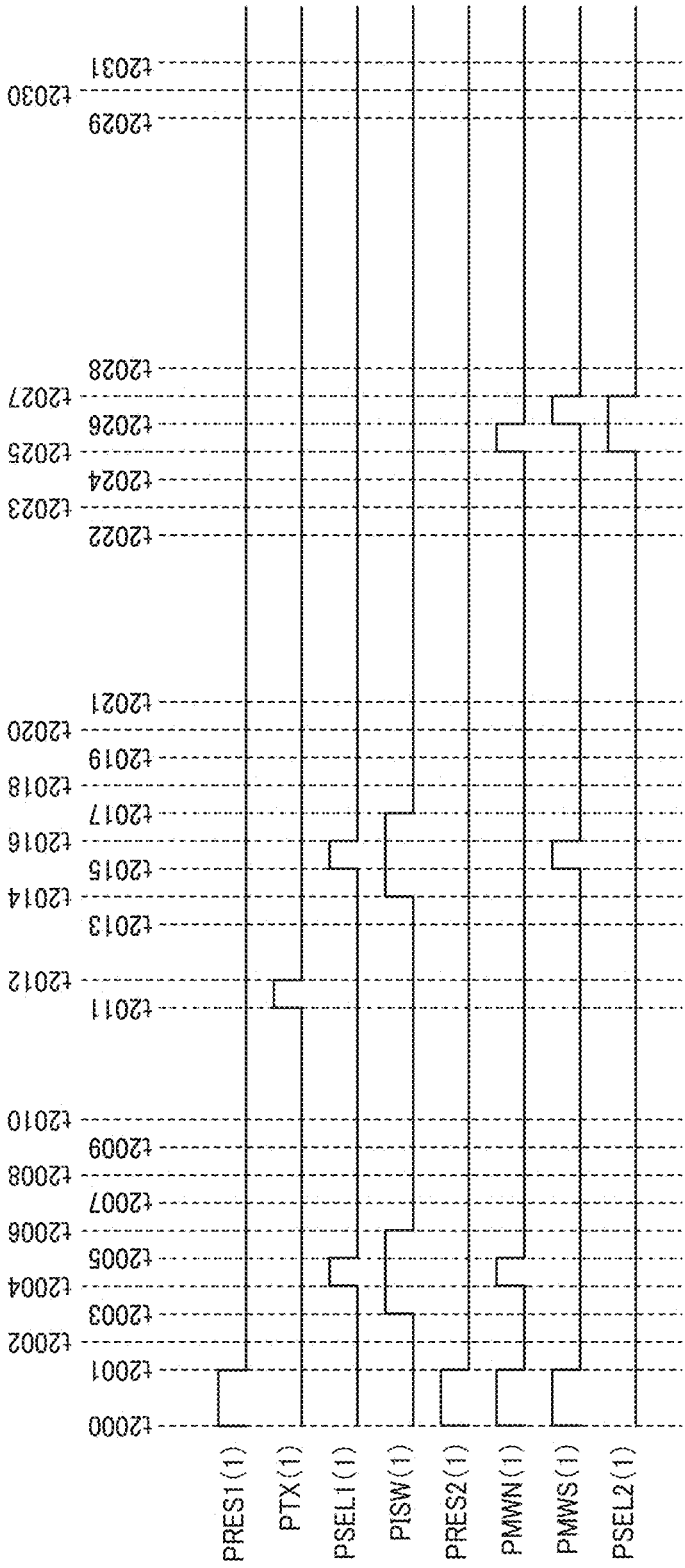
FIG. 21 is a timing chart showing an example of the driving method related to the fourth embodiment of the imaging element 2.
Figure 22:
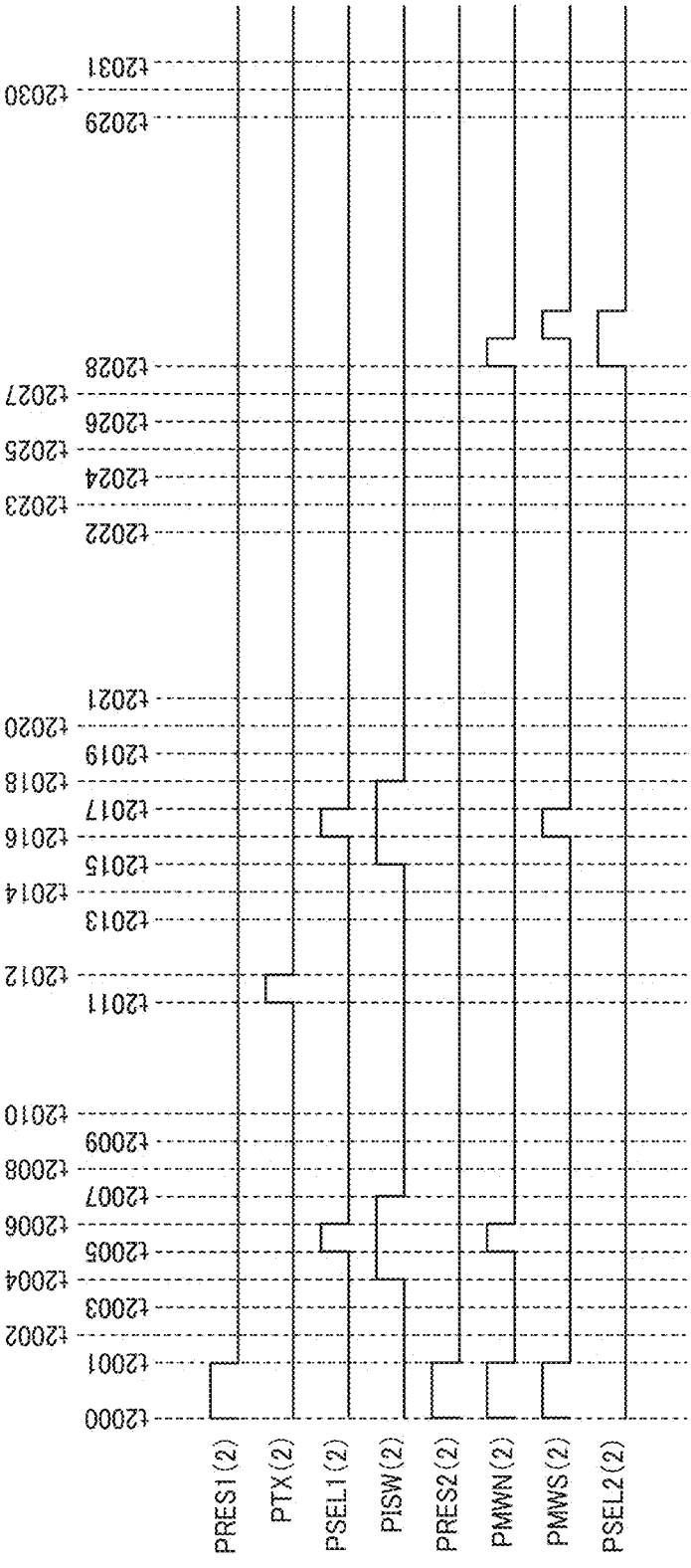
FIG. 22 is a timing chart showing an example of the driving method related to the fourth embodiment of the imaging element 2.
Figure 23:
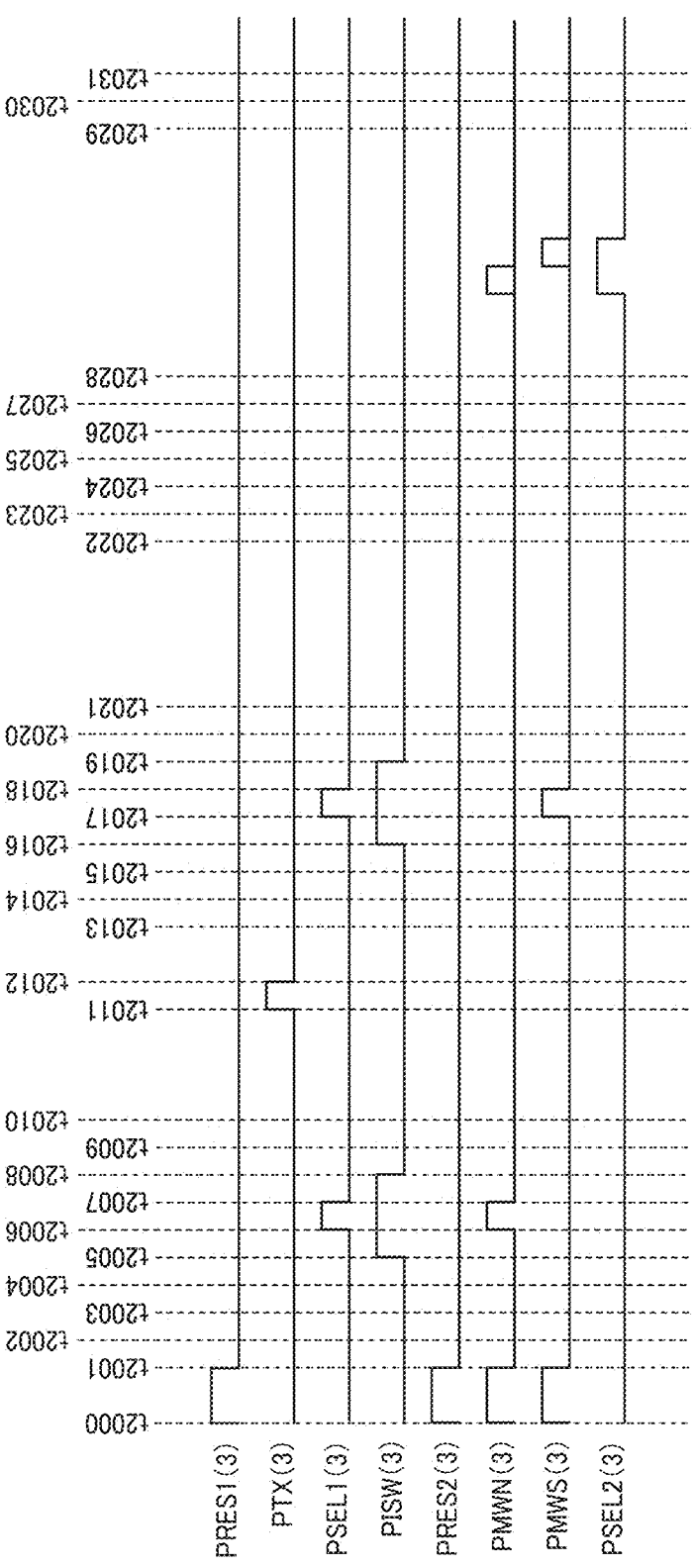
FIG. 23 is a timing chart showing an example of the driving method related to the fourth embodiment of the imaging element 2.
Figure 24:
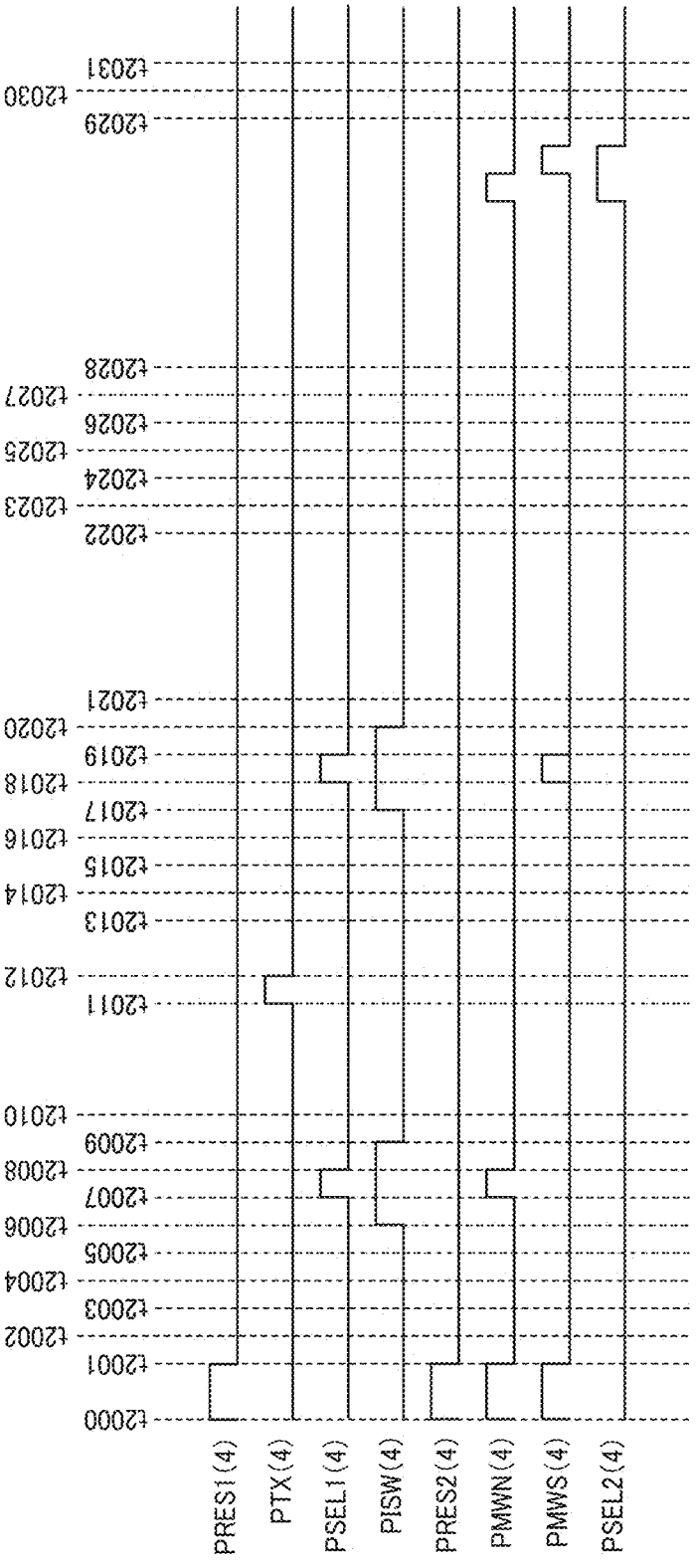
FIG. 24 is a timing chart showing an example of the driving method related to the fourth embodiment of the imaging element 2.
Figure 25:
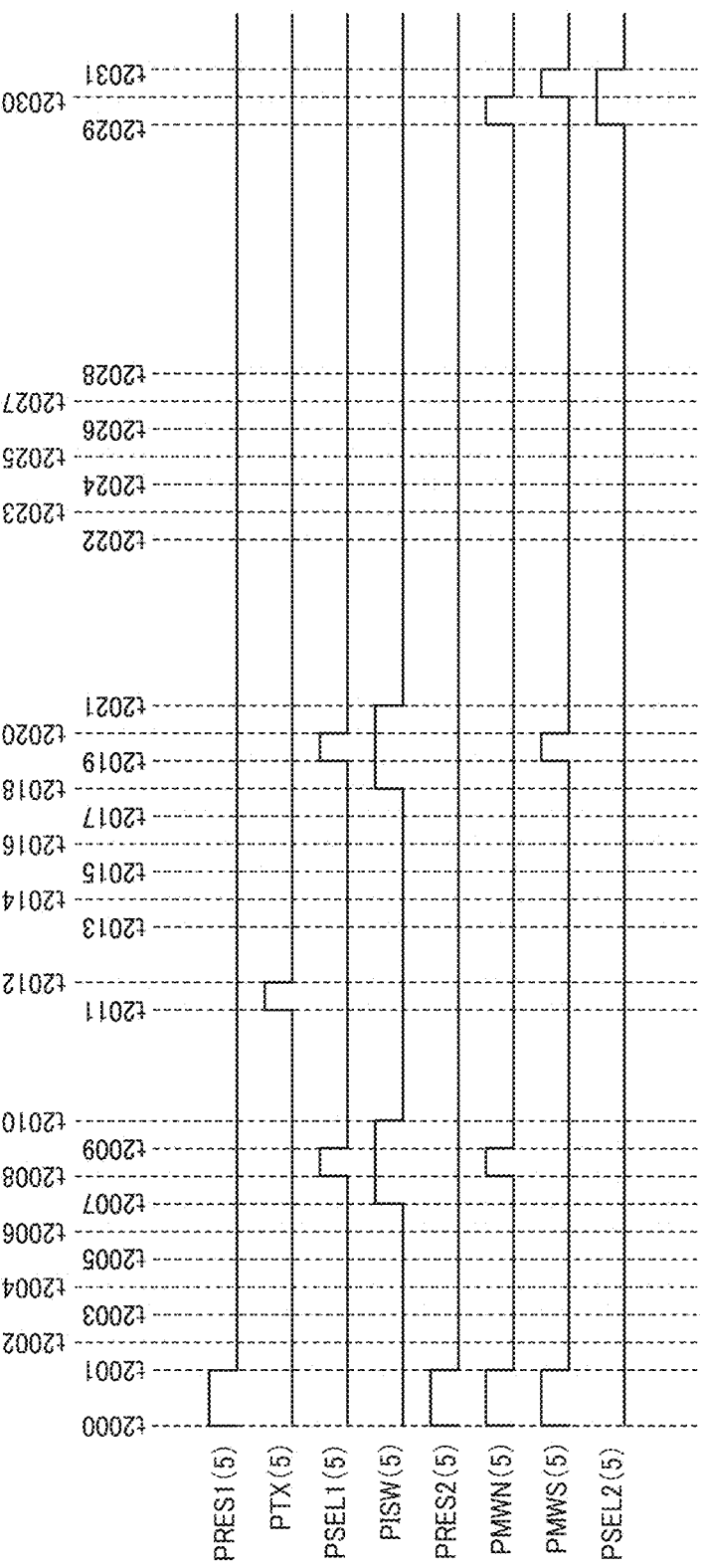
FIG. 25 is a timing chart showing an example of the driving method related to the fourth embodiment of the imaging element 2.

FIG. 19 is a timing chart showing an operation example when a zeroth row to a fifth row of the imaging element 2 are sequentially read out.

A period from time t1900 to time t1901 is a period in which the FD of all pixels and the voltage holding capacitors CS and CN are reset. A period from time t1901 to time t1902 is a period in which the N signals accumulated in each FD are sequentially written into the corresponding voltage holding capacitors CN from the zeroth row to the fifth row. A period from time t1902 to time t1903 is a period in which charges accumulated in each PD 10 are transferred to each corresponding FD for all pixels at once.

A period from time t1903 to time t1904 is a period in which a voltage (an S signal) of each FD is written into the corresponding voltage holding capacitor CS from the zeroth row to the fifth row. A period from time t1904 to time t1905 is a period in which the N signal and the S signal held in the voltage holding capacitors CN and CS are sequentially AD-converted and read out from the zeroth row.

As shown in FIG. 19, the period from time t1901 to time t1902 and the period from time t1903 to time t1904 are characterized in that the time period is shorter than the period from time t1904 to time t1905. The AD conversion performed in the period from time t1904 to time t1905 requires a predetermined operation period, and requires a corresponding amount of time in row order.

On the other hand, the periods from t1901 to t1902 and from t1903 to t1904 in which writing operations from the FD to the voltage holding capacitors CN and CS are performed, are voltage static periods, and since the voltage path to the voltage holding capacitors CN and CS provided in each pixel is very short, this period can be shortened, and thus, a charge holding period can be shortened in the FD.

Figure 6:
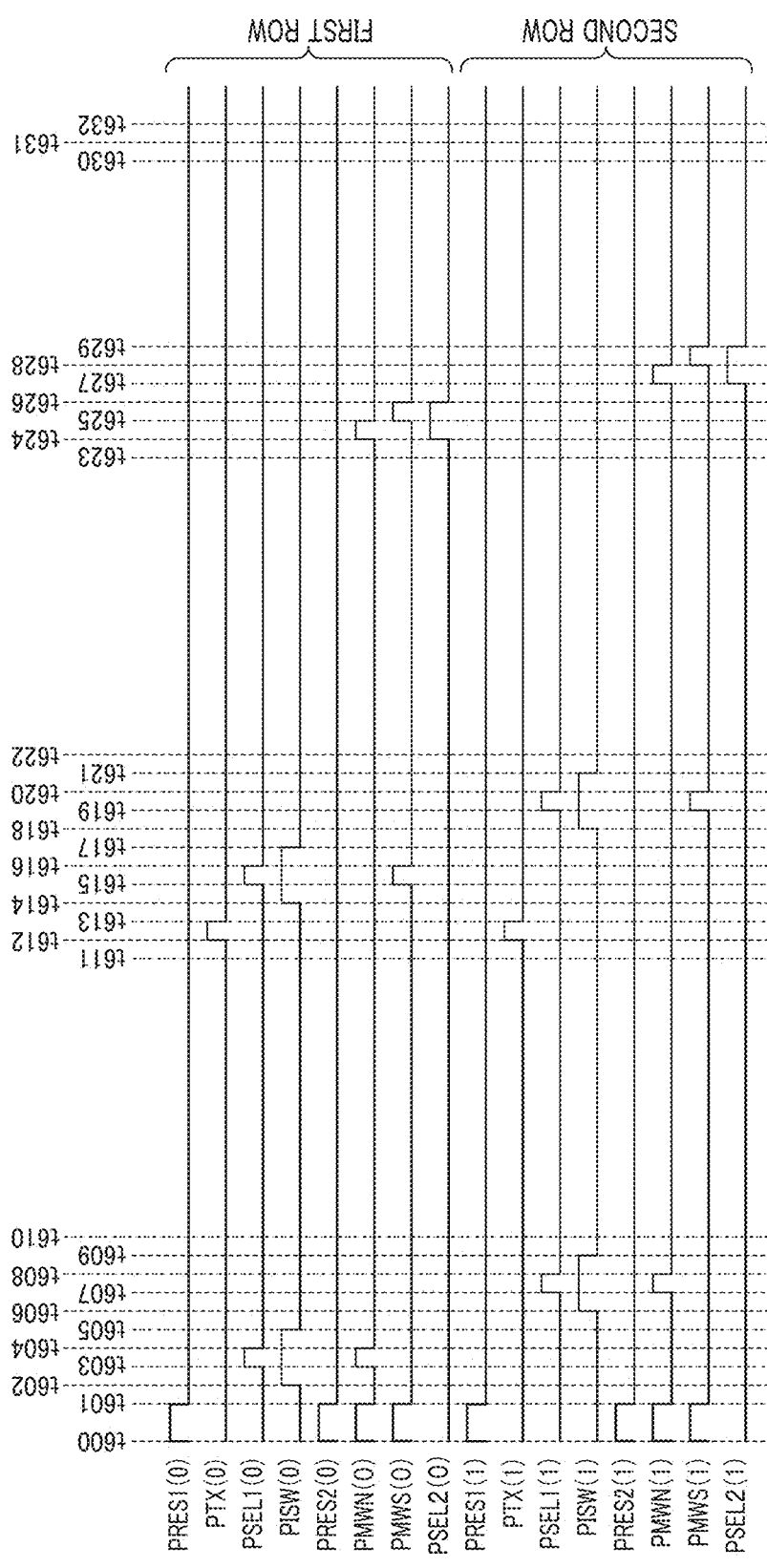
FIG. 6 is a timing chart showing an example of a driving method related to the first embodiment of the imaging element 2.
Figure 7:
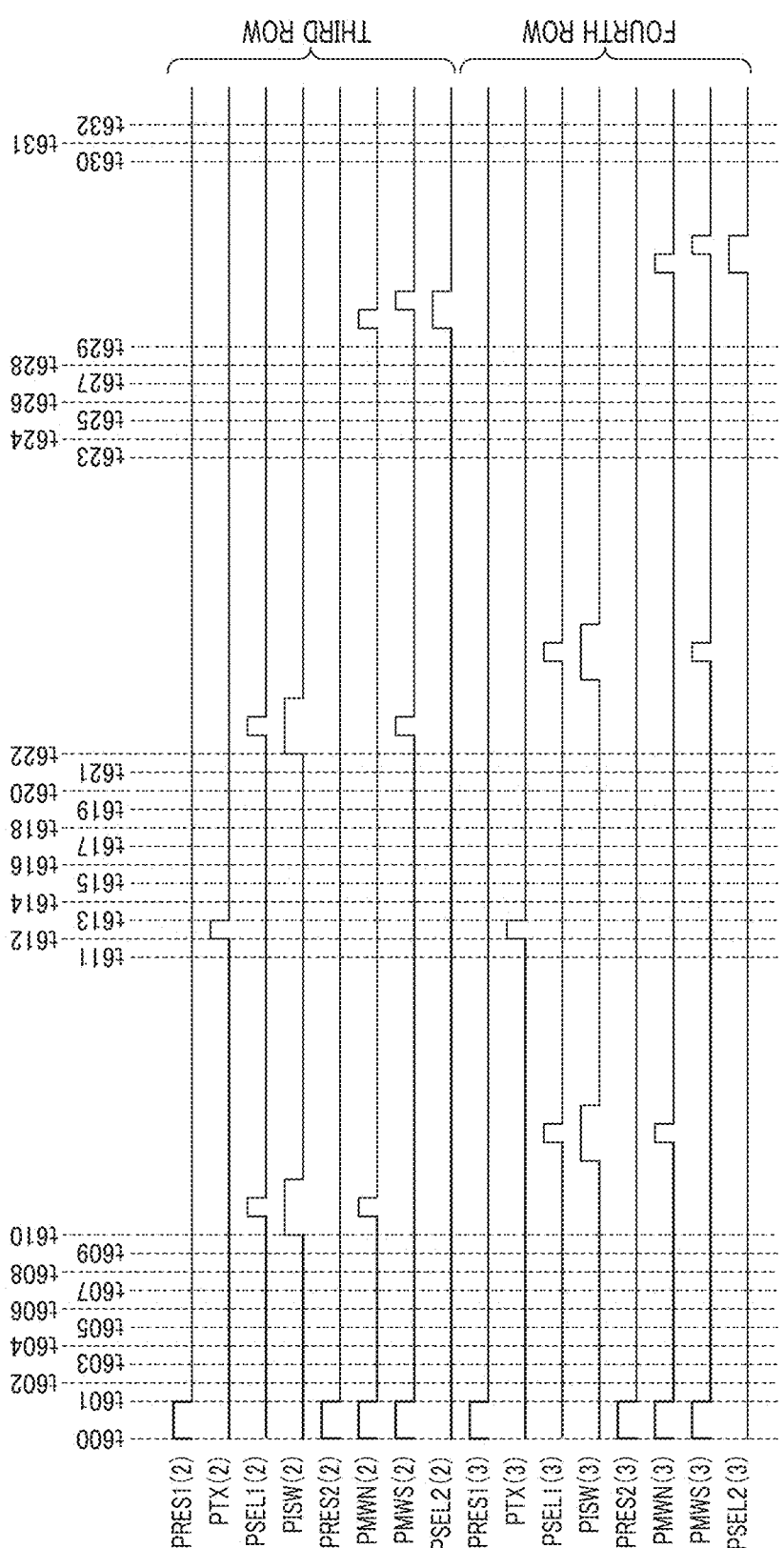
FIG. 7 is a timing chart showing an example of the driving method related to the first embodiment of the imaging element 2.
Figure 8:
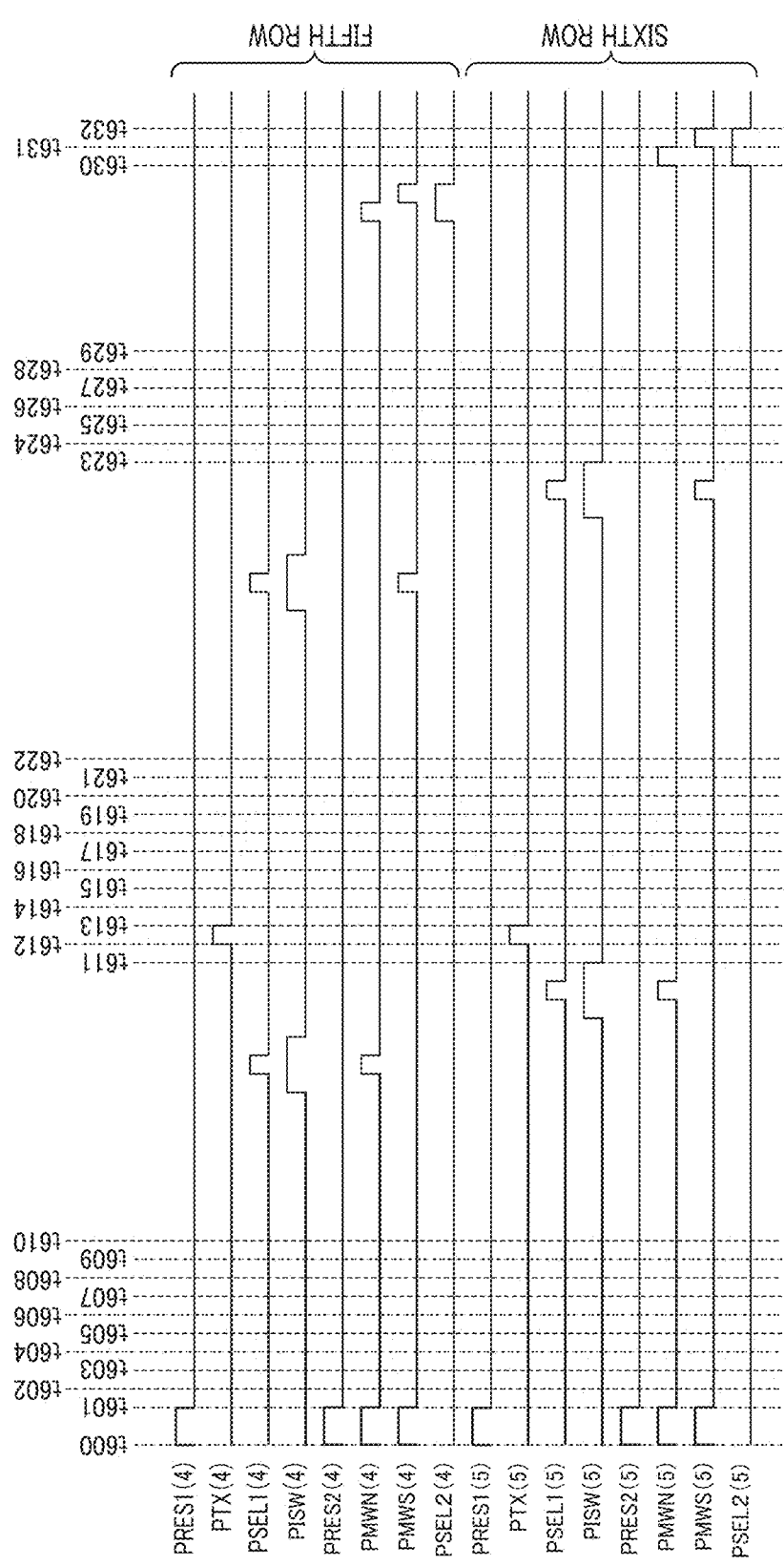
FIG. 8 is a timing chart showing an example of the driving method related to the first embodiment of the imaging element 2.

FIGS. 6 to 8 are timing charts showing a driving method related to the first embodiment of the imaging element 2. FIG. 6 is a timing chart of pixels in first and second rows, FIG. 7 is a timing chart of pixels in third and fourth rows, and FIG. 8 is a timing chart of pixels in fifth and sixth rows.

Each pulse is applied to a gate of each of the transistors, and when it is Hi (High), the transistor is turned on, and when it is Lo (Low), the transistor is turned off. The parentheses in the pulse name correspond to row numbers in the above-described schematic diagram.

From time t602 to time t623, there is a global electronic shutter operation in which the voltage signal corresponding to the signal charge of each pixel of the first frame is simultaneously transferred to the corresponding laminated circuit 12 of the laminated substrate 22 for all pixels.

Furthermore, a period from time t624 to time t632 is a scanning period for sequentially reading out the laminated circuits 12(0q) present in the first row of the laminated substrate 22 to the laminated circuits 12(5q) present in the sixth row.

First, from time t600 to time t601, PRES1(0 to 5), PRES2(0 to 5), PMWS(0 to 5), and PWMN (0 to 5) are set to Hi to reset the FD and voltage holding capacitors CS and CN.

At time t602, PISW(0) is set to Hi, and the current source I1 for the pixels in the first row is connected to the source side of SEL1.

Next, at time t603, PSEL1(0) and PMWN(0) are set to Hi, and at time t604, PWMN(0) is set to Lo, and thus the N signal is written into the voltage holding capacitor CN of the laminated circuit 12 (pq) as a voltage after the reset of the FD is released. Then, PSEL1 (0) is set to Lo, PISW(0) is set to Lo at time t605, and the current source I1 in the first row and the SEL1 are disconnected.

Next, at time t606, PISW (1) is set to Hi, and the current source I1 for the pixels in the second row is connected to the source side of SEL1. Next, at time t607, PSEL1 (1) and PMWN (1) are set to Hi, PWMN (1) is set to Lo at time t608, and thus the N signal is written into the voltage holding capacitor CN of the laminated circuit 12 (pq) as the voltage after the reset of the FD is released.

Then, PSEL1 (1) is set to Lo, PISW(1) is set to Lo at time t609, and the current source I1 in the second row and the SEL1 are disconnected. Then, similarly, from time t610 to time t611, the N signals from the third to sixth rows are sequentially written into the voltage holding capacitor CN of the laminated circuit 12 (pq).

Next, PTX (0 to 5) is set to Hi at time t612, PTX (0 to 5) to Lo at time t613, and thus the charges accumulated in the PD 10 are transferred to the FD for all pixels at once.

Next, at time t614, PISW (0) is set to Hi, and the current source I1 for the pixels in the first row is connected to the source side of the SEL1.

Next, PSEL1 (0) and PMWS (0) are set to Hi at time t615, PWMS (0) is set to Lo at time t616, and thus the voltage (the S signal) of the FD in the first row that varies according to the signal charge of the PD 10 is written into the voltage holding capacitor CS.

Then, PSEL1 (0) is set to Lo, PISW (0) is set to Lo at time t617, and thus the current source I1 in the first row and SEL1 are disconnected.

Next, at time t618, PISW (1) is set to Hi, and the current source I1 for pixels in the second row is connected to the source side of SEL1.

Next, PSEL1 (1) and PMWS (1) are set to Hi at time t619, PWMS (1) is set to Lo at time t620, and thus the voltage (the S signal) of the FD in the second row is written to the voltage holding capacitor CS.

Then, PSEL1(1) is set to Lo, PISW(1) is set to Lo at time t621, and the current source I1 in the second row is disconnected from the source side of SEL1.

Thereafter, similarly, from time t622 to time t623, the S signals from the third to sixth rows are sequentially written into the voltage holding capacitor CS of the laminated circuit 12 (pq).

In this way, it is possible to curb the peak current flowing through the amplification transistor SF1 while maintaining globality by sequentially transferring the voltage signals (the pixel signals) transferred to the FD all at once to the voltage holding capacitor CS.

From time t624 to time t626, the signals in the first row are read out. That is, due to the vertical scanning circuit 20, PSEL2 (0) in the first row becomes Hi from time t624 to time t626, and PMWN (0) in the first row becomes Hi from time t624 to time t625. Thus, the N signals in the first row are transferred to the AD conversion circuit ADq0 via the vertical output line VLq0, and the signals for eight pixels in the first row are AD-converted.

Furthermore, PMWS (0) in the first row becomes Hi from time t625 to time t626, and thus the S signals in the first row are transferred to the AD conversion circuit ADq0 via the vertical output line VLq0, and the signals for eight pixels in the first row are AD-converted.

At time t627, when the vertical scanning circuit 20 moves to scan the second row, PSEL2 (1) in the second row becomes Hi until time t629.

PMWN (1) in the second row becomes Hi from time t627 to time t628, thus the N signals in the second row are transferred to the AD conversion circuit ADq0 via the vertical output line VLq0, and the signals for eight pixels in the second row are AD-converted.

Furthermore, PMWS (1) in the second row becomes Hi from time t628 to time t629, thus the S signals in the second row are transferred to the AD conversion circuit ADq0 via the vertical output line VLq0, and the signals for eight pixels in the second row are AD-converted.

Then, similarly to each row, an operation in which the N signals are transferred to the AD conversion circuit ADq0 via the vertical output line VLq0, the N signals are AD-converted, then the N signals are transferred to the AD conversion circuit ADq0 via the vertical output line VLq0, and the S signal is AD-converted is repeated.

Then, when readout of the sixth row starts at time t630 at which PSEL2 (5) in the sixth row becomes Hi, and the AD conversion operation of the S signals for eight pixels in the sixth row ends at time t632, readout scanning of all pixels is completed.

Here, the period from time t602 to time t611 during which the N signals are sequentially written from the FD to the voltage holding capacitor CN corresponds to a period from time t1901 to time t1902 shown in FIG. 19. Further, the period from time t614 to time t615 during which the S signals are sequentially written from the FD to the voltage holding capacitor CS corresponds to a period from time t1903 to time t1904 shown in FIG. 19.

Further, the period from time t624 to time t632 during which the voltage signals (the N signals and the S signals) are AD-converted and sequentially read out corresponds to a period from time t1904 to time t1905 shown in FIG. 19. In this way, after the charges of a plurality of pixels are transferred to the voltage holding capacitors CN and CS as voltage holding units, the voltage signals held in the voltage holding units are sequentially converted into digital signals by the AD conversion unit.

As described above, the imaging device A transfers the charges accumulated in the PD 10 all at once to the FD and thus sequentially performs the transfer from the FD to the voltage holding capacitors CN and CS row by row while globality is maintained. That is, the amplification transistor SF1, which is a source follower unit, and the current source I1 are connected in sequence.

Thus, it is possible to reduce the peak power of the imaging element 2 compared to when the signals for all pixels are simultaneously transferred to the voltage holding capacitors CN and CS. Furthermore, in the first embodiment, by shortening a charge holding time in the FD, it is also possible to reduce deterioration of image quality caused by noise generated in the FD and image quality such as parasitic light sensitivity (PLS).

The imaging element 2 uses the FD to hold the charges generated in the PD 10. However, the imaging element 2 can operate in the same manner even if it has a memory capacity (a charge holding unit) in addition to the FD. Further, in the imaging element 2, the laminated circuit 12 ($pq$) does not need to be provided on the laminated substrate 22 in addition to the PD substrate 21.

The imaging element 2 may include a laminated circuit 12 ($pq$) on the PD substrate 21 in proximity to the pixel circuit 11 ($pq$). However, it is advantageous to provide the laminated circuit 12 ($pq$) on the laminated substrate 22 in that stray light is less likely to enter the voltage holding capacitors CN and CS.

In order to reduce a voltage (signal influence) that decreases due to charges generated by the stray light, it is preferable to make the voltage holding capacitors CN and CS as larger as possible than a capacitance of the FD unit of the PD substrate 21. It is advantageous to provide the laminated circuit 12 ($pq$) on the laminated substrate 22 in order to increase the voltage holding capacitance of the voltage holding capacitors CN and CS.

Second Embodiment

[Imaging Device]

In a second embodiment, by transferring the charges accumulated in the PD 10 to the FD all at once, the transfer from the FD to the voltage holding capacitors CN and CS is performed sequentially for each region (block unit) while globality is maintained. Thus, the peak power of the imaging element 2 is reduced. Description of the same configurations as in the first embodiment will be omitted.

Figure 9:
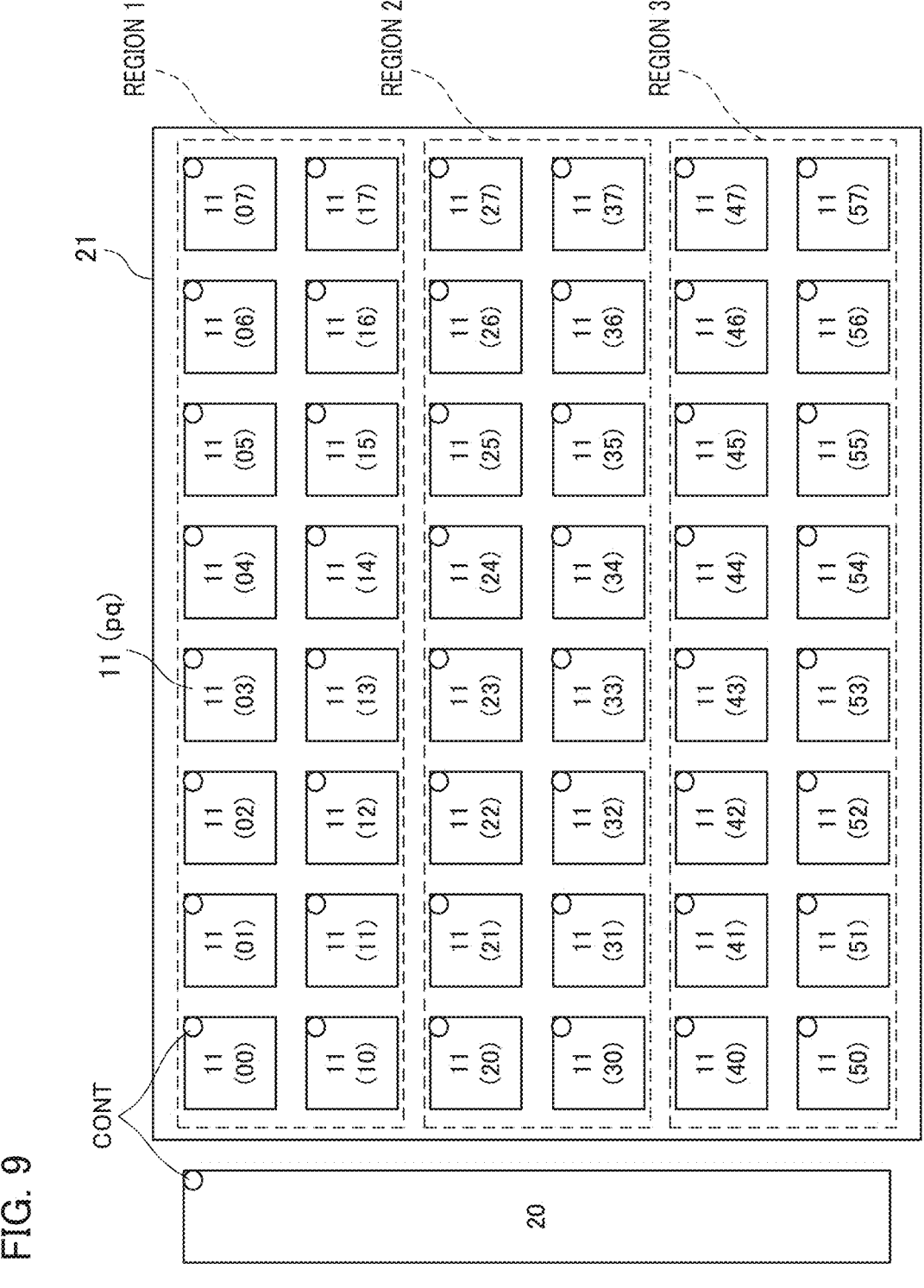
FIG. 9 is a schematic diagram showing a configuration example of a non-light receiving surface of a PD substrate 21 of an imaging element 2 in a second embodiment and is a diagram seen from a light receiving surface side.

FIG. 9 is a schematic diagram showing a configuration example of a non-light receiving surface of the PD substrate 21 of the imaging element 2 and is a diagram seen from the light receiving surface side. On this non-light receiving surface, the pixel circuits 11 ($pq$) are arranged in a two-dimensional manner, and regions are divided every two rows. The zeroth and first rows are region 1, the second and third rows are region 2, and the fourth and fifth rows are region 3. The vertical scanning circuit 20 is configured to control each of region 1, region 2, and region 3.

[Imaging Method]

Figure 10:
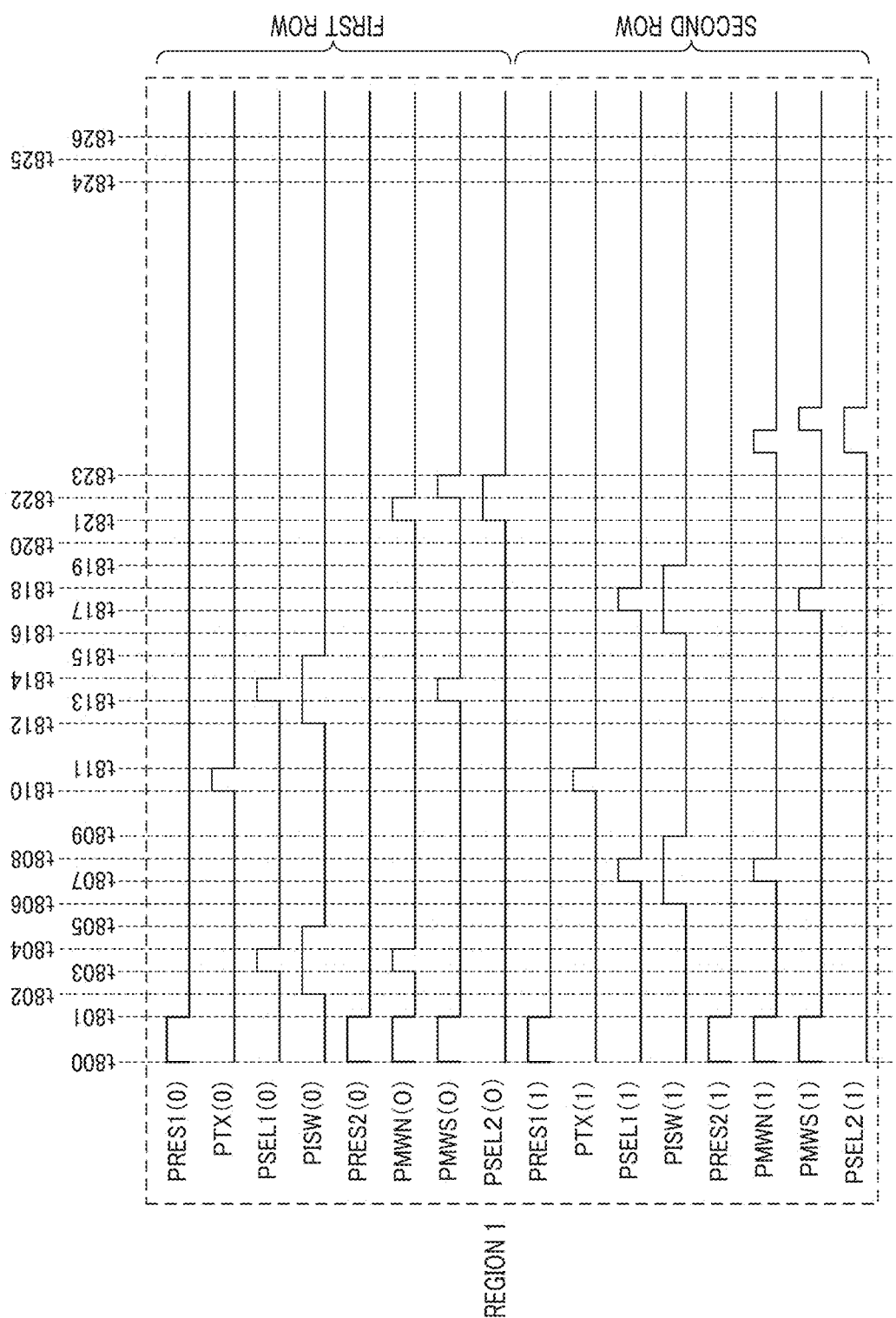
FIG. 10 is a timing chart showing an example of a driving method related to the second embodiment of the imaging element 2.
Figure 11:
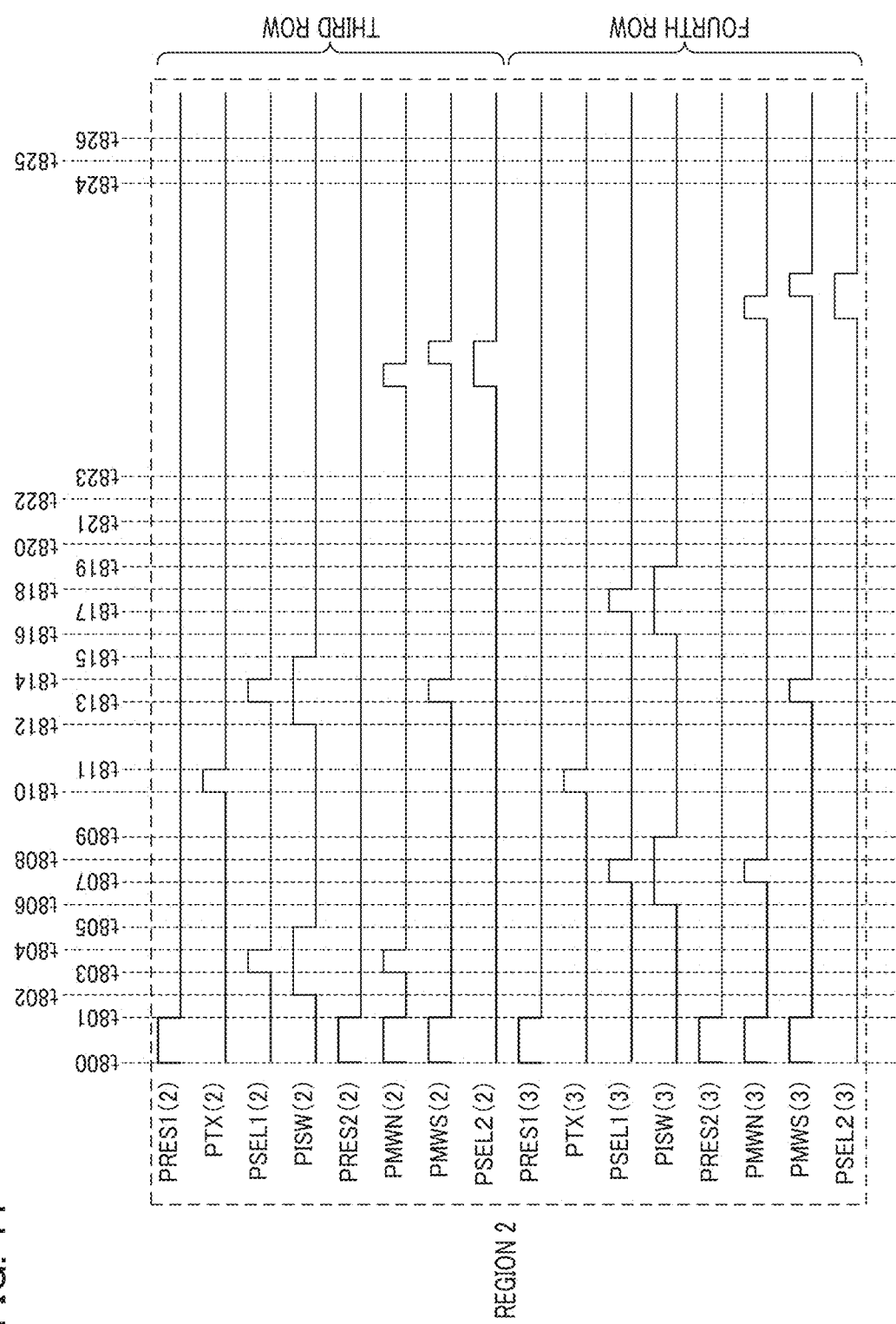
FIG. 11 is a timing chart showing an example of the driving method related to the second embodiment of the imaging element 2.
Figure 12:
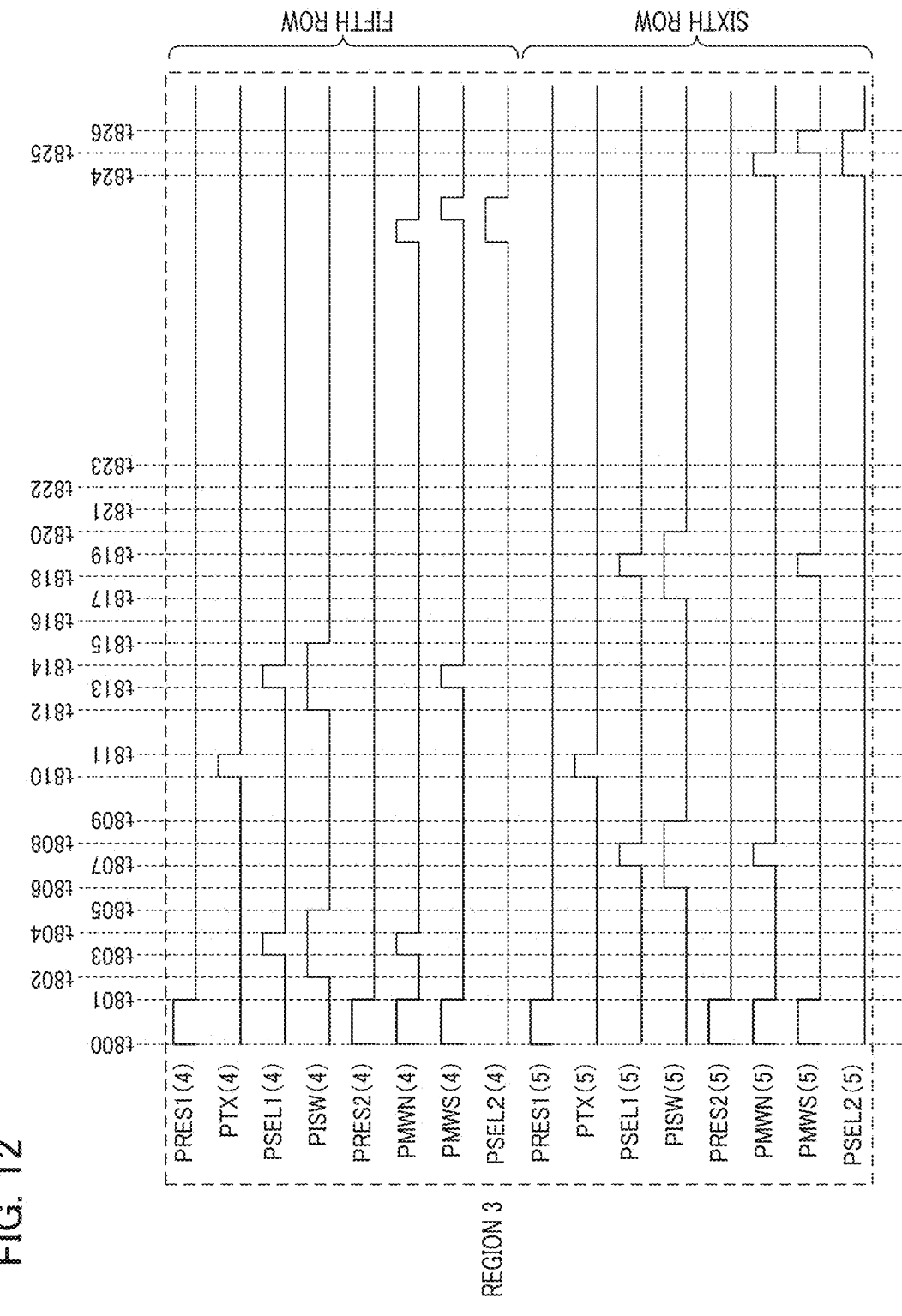
FIG. 12 is a timing chart showing an example of the driving method related to the second embodiment of the imaging element 2.

Next, a method of driving the imaging element 2 will be described. FIGS. 10 to 12 are timing charts showing an example of a driving method related to the second embodiment of the imaging element 2. FIG. 10 is a timing chart of pixels in region 1 (the first and second rows), FIG. 11 is a timing chart of pixels in region 2 (the third and fourth rows), and FIG. 12 is a timing chart of pixels in region 3 (the fifth and sixth rows).

Each pulse is applied to the gate of each of the transistors, and when it is Hi (High), the transistor is turned on, and when it is Lo (Low), the transistor is turned off. The parentheses in the pulse name correspond to the row numbers in the above-described schematic diagram.

From time t802 to time t820, there is a global electronic shutter operation in which a voltage signal corresponding to the signal charge of each pixel of the first frame is simultaneously transferred to the corresponding laminated circuit 12 of the laminated substrate 22 for all pixels.

Furthermore, a period from time t821 to time t826 is a scanning period for sequentially reading out the laminated circuits 12 ($0q$) present in the first row of the laminated substrate 22 to the laminated circuits 12 ($5q$) present in the sixth row.

First, from time t800 to time t801, PRES1 (0 to 5), PRES2 (0 to 5), PMWS (0 to 5), and PWMN (0 to 5) are set to Hi to reset the FD and the voltage holding capacitors CS and CN.

At time t802, PISW (0, 2, 4) is set to Hi, and the current source I1 for each pixel in the first row of region 1, the first row of region 2, and the first row of region 3 is connected to the source side of SEL1.

Next, at time t803, PSEL1 (0, 2, 4) and PMWN (0, 2, 4) are set to Hi, and at time t804, PWMN (0, 2, 4) is set to Lo. Thus, the N signal is written to the voltage holding capacitor CN of the laminated circuit 12 ($pq$) as the voltage after the FD reset is released for each pixel in the first row of region 1, the first row of region 2, and the first row of region 3.

Then, PSEL1 (0, 2, 4) is set to Lo, PISW (0, 2, 4) is set to Lo at time t805, and the current sources I1 for the pixels in the first row of region 1, the first row of region 2, and the first row of region 3 and SELL are disconnected.

Next, at time t806, PISW (1, 3, 5) is set to Hi, and the current source I1 for the pixels in the second row of region 1, the second row of region 2, and the second row of region 3 is connected to the source side of SEL1.

Next, at time t807, PSEL1 (1, 3, 5) and PMWN (1, 3, 5) are set to Hi, and at time t808, PWMN (1, 3, 5) is set to Lo. Thus, an N signal is written to the voltage holding capacitor CN of the laminated circuit 12 ($pq$) as the voltage after the reset of the FD is released for each of the pixels in the second row of region 1, the second row of region 2, and the second row of region 3.

Then, PSEL1 (1, 3, 5) is set to Lo, PISW (1, 3, 5) is set to Lo at time t809, and the current sources I1 for the pixels in the second row of region 1, the second row of region 2, and the second row of region 3 and SEL1 are disconnected.

Next, due to PTX (0 to 5) becoming Hi at time t810, and PTX (0 to 5) becoming Lo at time t811, the charges accumulated in the PD 10 are transferred to the FD to all pixels at once.

Next, at time t812, PISW (0, 2, 4) is set to Hi, and the current sources I1 for the pixels in the first row of region 1, the first row of region 2, and the first row of region 3 are connected to the source side of SEL1.

Next, at time t813, PSEL1 (0, 2, 4) and PMWS (0, 2, 4) are set to Hi, and at time t814, PWMS (0, 2, 4) is set to Lo. Thus, the voltage (S signal) of the FD for the pixels in the first row of region 1, the first row of region 2, and the first row of region 3, which is varied according to the signal charge of PD 10, is written into the voltage holding capacitor CS.

Then, PSEL1 (0, 2, 4) is set to Lo, PISW (0, 2, 4) is set to Lo at time t815, and the current sources I1 for the pixels in the first row of region 1, the first row of region 2, and the first row of region 3 and SEL1 are disconnected.

Next, at time t816, PISW (1, 3, 5) is set to Hi, and the current sources I1 for pixels in the first row of region 1, the first row of region 2, and the first row of region 3 are connected to the source side of SEL1. Next, at time t819, PSEL1 (1, 3, 5) and PMWN (1) are set to Hi, and at time t820, PWMN (1, 3, 5) is set to Lo.

Thus, the FD voltage (the S signal) for the pixels in the second row of region 1, the second row of region 2, and the second row of region 3 is written into the voltage holding capacitor CS. Then, PSEL1 (1, 3, 5) is set to Lo, PISW (1, 3, 5) is set to Lo at time t821, and the current sources I1 for the pixels in the second row of region 1, the second row of region 2, and the second row of region 3 and SEL1 are disconnected.

From time t821 to time t823, the signals in the first row are read out. From time t821 to time t826, regarding the readout operation of each row, the transfer of the N signal to the vertical output line, the AD conversion of the N signal, the transfer of the S signal, and the AD conversion of the S signal are performed in sequence. This operation is similar to the operation from time t624 to time t632 in the first embodiment, and thus the description thereof will be omitted.

In the second embodiment, the imaging device A transfers the charges accumulated in the PD 10 to the FD all at once, thereby sequentially performing the transfer from the FD to the voltage holding capacitors CN and CS in each predetermined region while globality is maintained. Thus, the peak power of the imaging device A can be reduced by half compared to when all pixels perform the transfer to the voltage holding capacitors CN and CS at the same time.

Furthermore, compared to the configuration in the first embodiment, since the transfer from the FD to the voltage holding capacitors CN and CS is sequentially performed for each row of the region, it is possible to shorten the readout time. Furthermore, since a charge holding time in the FD is shortened, deterioration in image quality can also be curbed.

In the first embodiment and the second embodiment, for the arranged pixels, the transfer from the FD to the voltage holding capacitors CN and CS is performed row by row. The present invention is not limited thereto, and it is also possible to perform the transfer sequentially for each pixel or for each color filter (not shown) (that is, for each color), and the same effect can be obtained.

Furthermore, in the first embodiment and the second embodiment, the vertical output line VLq0 of the laminated circuit 12 is a common wiring for each column in each region. The present invention is not limited thereto, and a vertical output line or an AD conversion circuit may be provided for each region.

Third Embodiment

[Imaging Device]

The third embodiment has a configuration in which a charge holding capacitor MEM that holds the charge of the pixel is provided, and the amplification transistor SF1 (the source follower unit) is shared by a plurality of pixels. The peak power flowing to SF is curbed while globality is maintained. Description of the same configurations as in the first embodiment and the second embodiment will be omitted.

Figure 13:
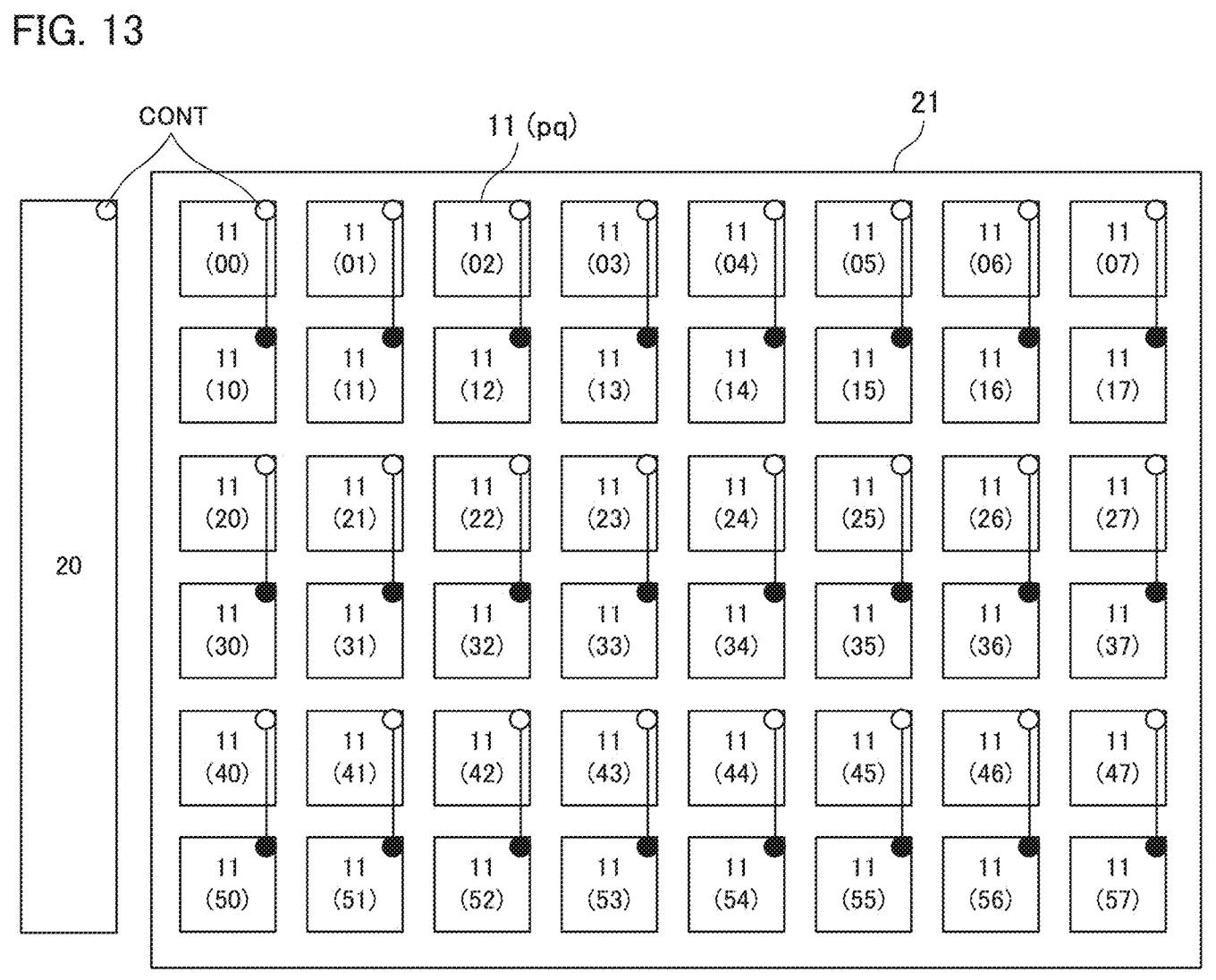

FIG. 13 is a schematic diagram showing a configuration example of a non-light receiving surface of a PD substrate 21 of an imaging element 2 in a third embodiment, and is a diagram seen from the light receiving surface side. The pixel circuit 11 (pq) has a charge holding capacitor MEM for each pixel. The charge holding capacitor MEM functions as a charge holding unit different from the FD.

Further, the reset transistor RES1, the amplification transistor SF1, the selection transistor SEL1, the current source switch ISW, the current source I1, and the contact CONT are shared by the FD and two vertical pixels.

The voltage signal that is an output of the pixel circuit 11 (pq) can be sequentially transferred to the laminated substrate 22, which will be described below, via one contact CONT shared by two vertical pixels. The contact CONT is connected to the vertical scanning circuit 20 of the laminated substrate 22, and the global electronic shutter operation can be realized by outputting a control signal to the PD or the like on the PD substrate 21.

Figure 14:
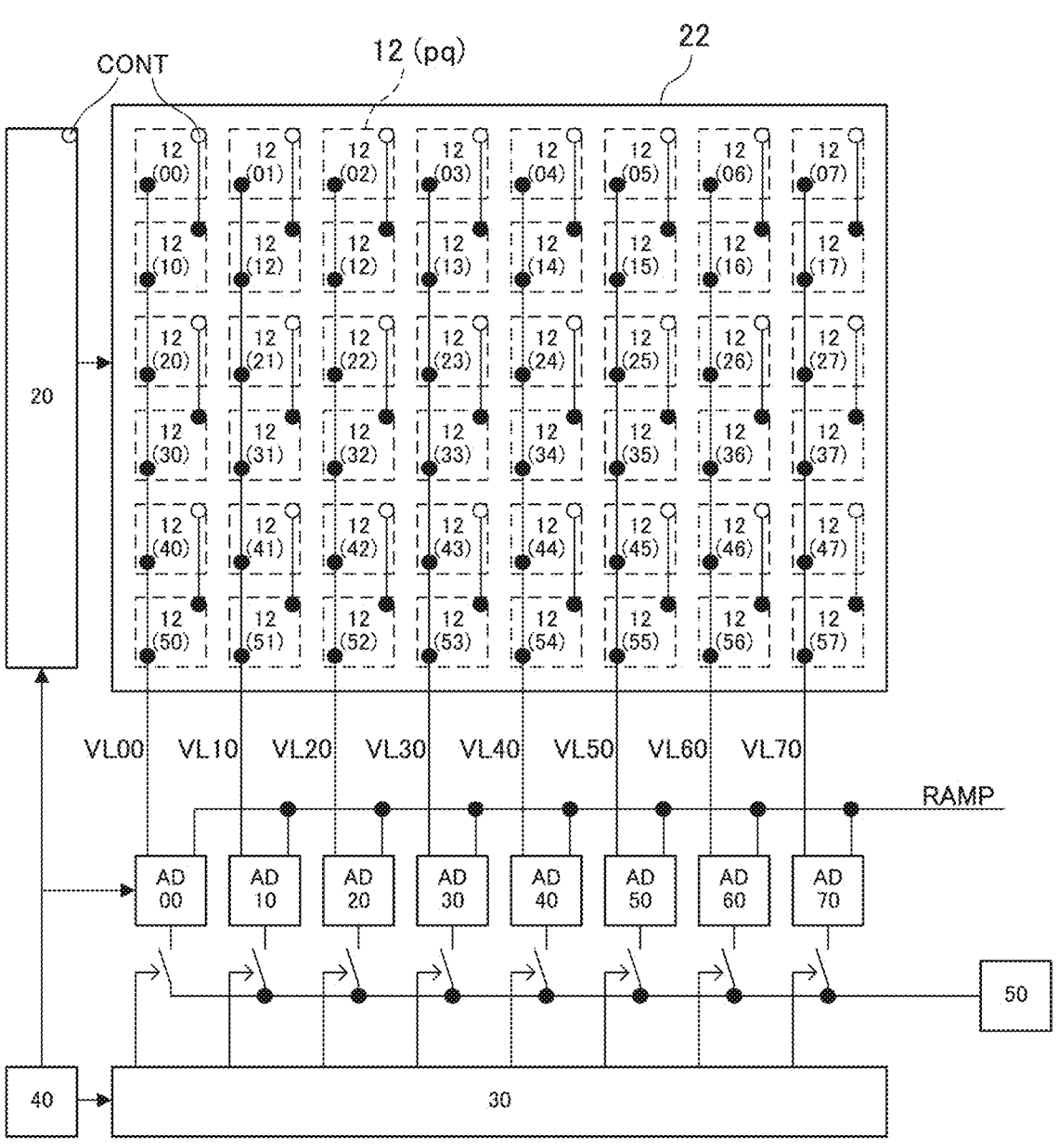
FIG. 14 is a schematic diagram showing a configuration example of a laminated substrate 22 of an imaging element 2 related to the third embodiment.

FIG. 14 is a schematic diagram showing a configuration example of the laminated substrate 22 of the imaging element 2 related to the third embodiment. The laminated circuits 12 (pq) are arranged in a two-dimensional matrix in correspondence to the pixel circuits 11 (pq) of the PD substrate 21. Since the pixel circuit 11 (pq) is connected to two vertical pixels through one contact CONT, the voltage signal that is an output thereof is sequentially transferred to the laminated circuit 12 (pq) for corresponding two vertical pixels.

The accumulated voltage signals (the pixel signals) are transmitted in row order to the AD conversion circuit ADq0 via the vertical output line VLq0 by the vertical scanning circuit 20 that scans the laminated circuit 12, and are AD-converted. The AD-converted digital signals are output to the output unit 50 via the horizontal output line HL in column order by the horizontal scanning circuit 30.

The output unit 50 includes a known parallel/serial converter (the P/S converter), and sequentially converts the digital image signal transferred to the horizontal output line HL into a high-speed serial transmission format such as LVDS, and outputs the converted signal. Further, correction processing for point defects and the like may be included.

In the imaging device A, one vertical output line VLq0 is present in each column, and is shared by all rows in the same column. Further, one AD conversion circuit ADq0 is also present in each column. A vertical output line VLq0 and a reference signal RAMP that varies in proportion to time are input to the AD conversion circuit ADq0.

The structure of the laminated circuit 12 (pq) for accumulating the voltage signals, together with the PD 10 (pq) and the pixel circuit 11 (pq), will be described below using an equivalent circuit diagram. Furthermore, a predetermined driving timing, control of the AD conversion circuit ADq0, and a horizontal scanning timing that the vertical scanning circuit 20 provides to the laminated circuit 12 (pq) in row order are generated by the timing generation circuit 40.

Figure 15:
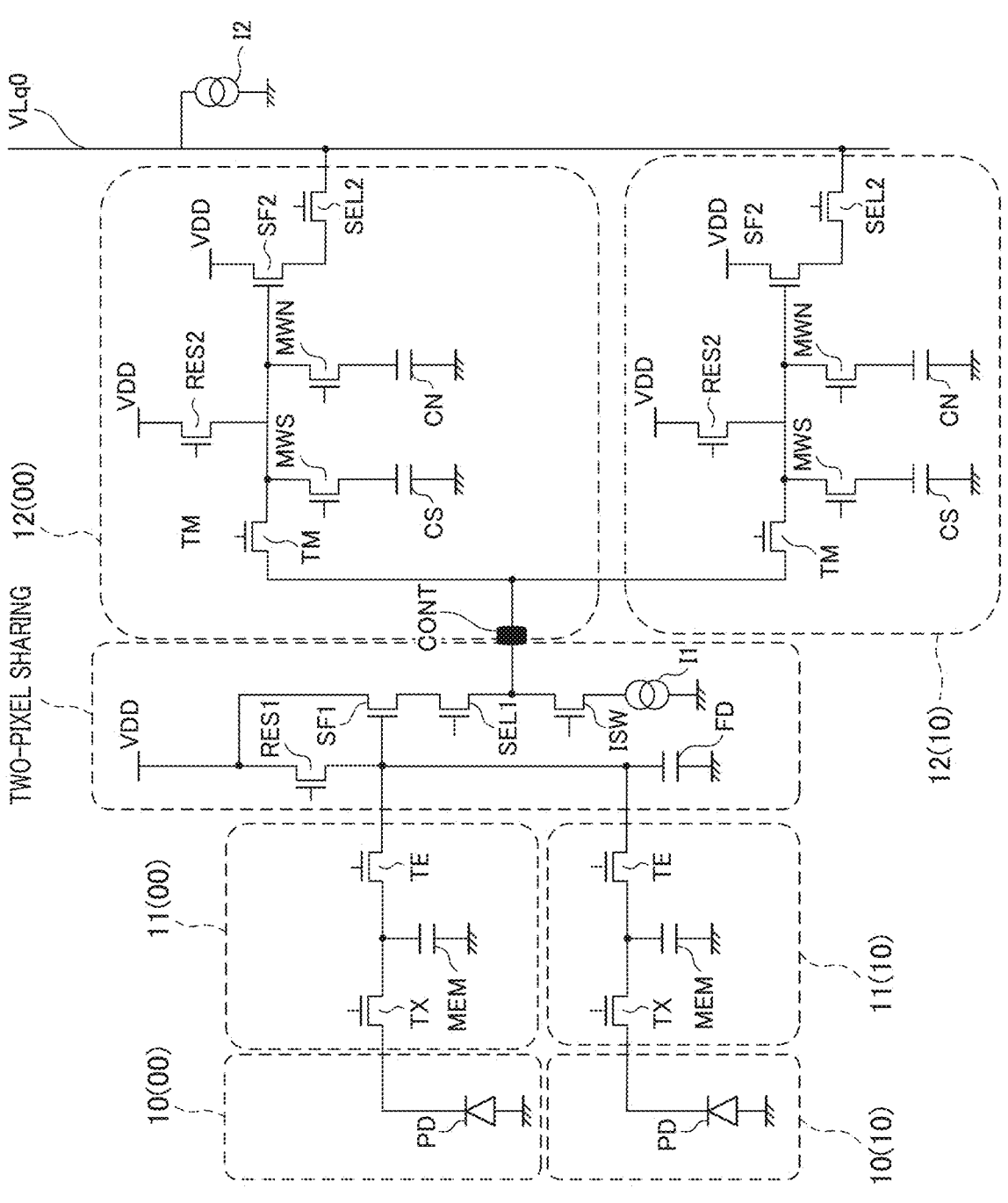
FIG. 15 is an equivalent circuit diagram showing a configuration example of a PD 10, a pixel circuit 11, and a laminated circuit 12 according to the third embodiment.

FIG. 15 is an equivalent circuit diagram showing a configuration example of the PD 10, the pixel circuit 11, and the laminated circuit 12 related to the third embodiment. PD 10 (00) and PD 10 (10) for two vertical pixels, pixel circuits 11 (00) and 11 (10), a two-vertical-pixels sharing unit, and laminated circuits 12 (00) and 12 (10) are shown.

A charge holding capacitor MEM that transfers the charges generated in the PD 10 to the FD via the transfer transistor TX and a transfer transistor TE that transfers the charges of the charge holding capacitor MEM to the FD are provided for each pixel in the PD 10 (pq) and the pixel circuit 11 (pq).

The two vertical pixels of the pixel circuit 11 (00) and the pixel circuit 11 (10) share the FD, the reset transistor RES1, the amplification transistor SF1, the selection transistor SEL1, the current source switch ISW, and the current source I1. The electrical contact CONT that connects the pixel circuit 11 to the laminated circuit 12 is also shared by the two vertical pixels.

Using the shared units, the charges accumulated in the PD 10 (00) of the pixel is transferred to the charge holding capacitor MEM of the pixel circuit 11 (00) and is then transferred to the FD of the two-vertical-pixels sharing unit. Then, the charges are sequentially transferred to the laminated circuit 12 (00) via the amplification transistor (the source follower unit) SF1 and the contact CONT.

In addition, in the laminated circuit 12 (pq), the transfer transistor TM that transfers a voltage signal (a pixel signal) to the voltage holding capacitors CS and CN is provided for each pixel. The transfer transistors TE and TM can be controlled by the vertical scanning circuit 20 via PTE and PTM, respectively.

[Imaging Method]

Figure 16:
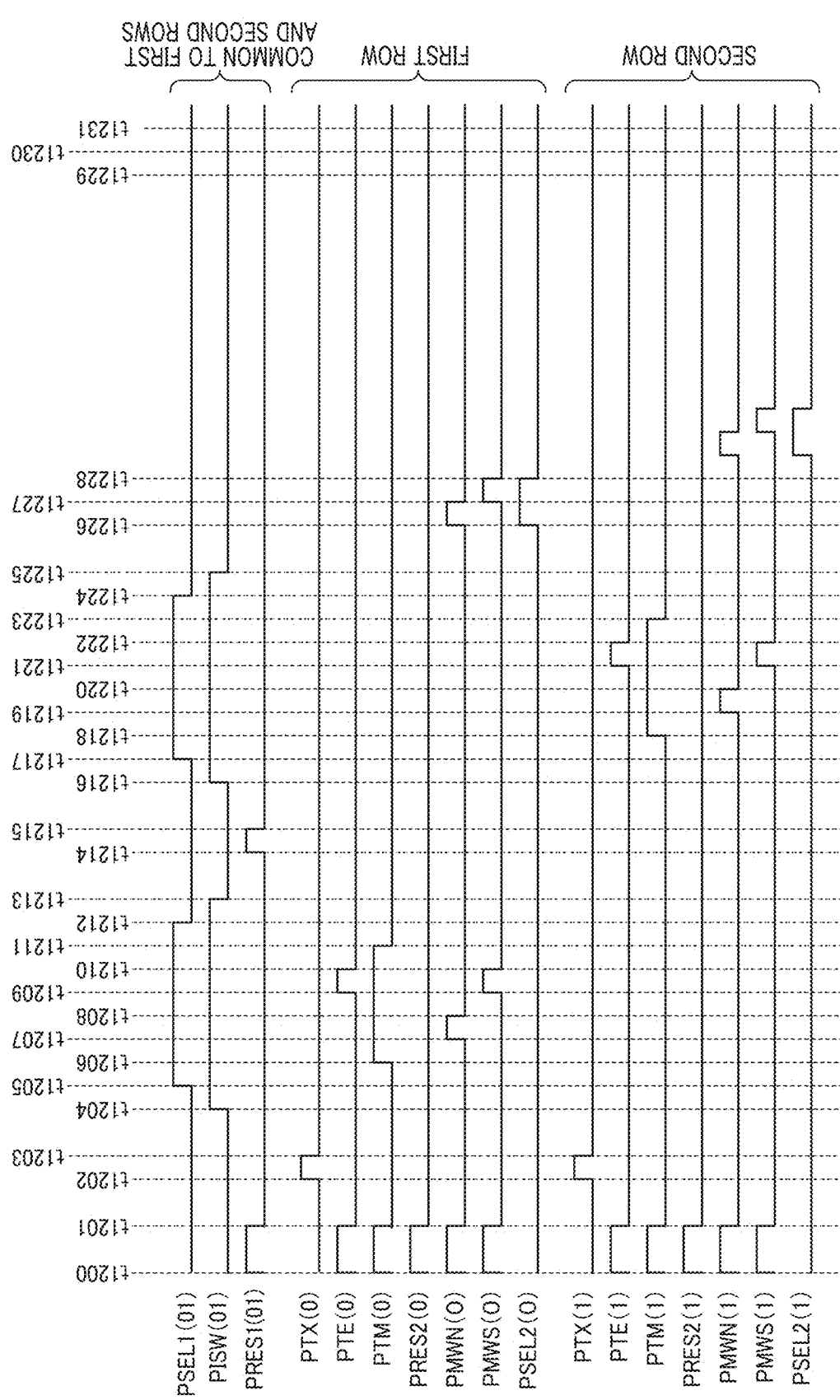
FIG. 16 is a timing chart showing an example of a driving method related to the third embodiment of the imaging element 2.
Figure 17:
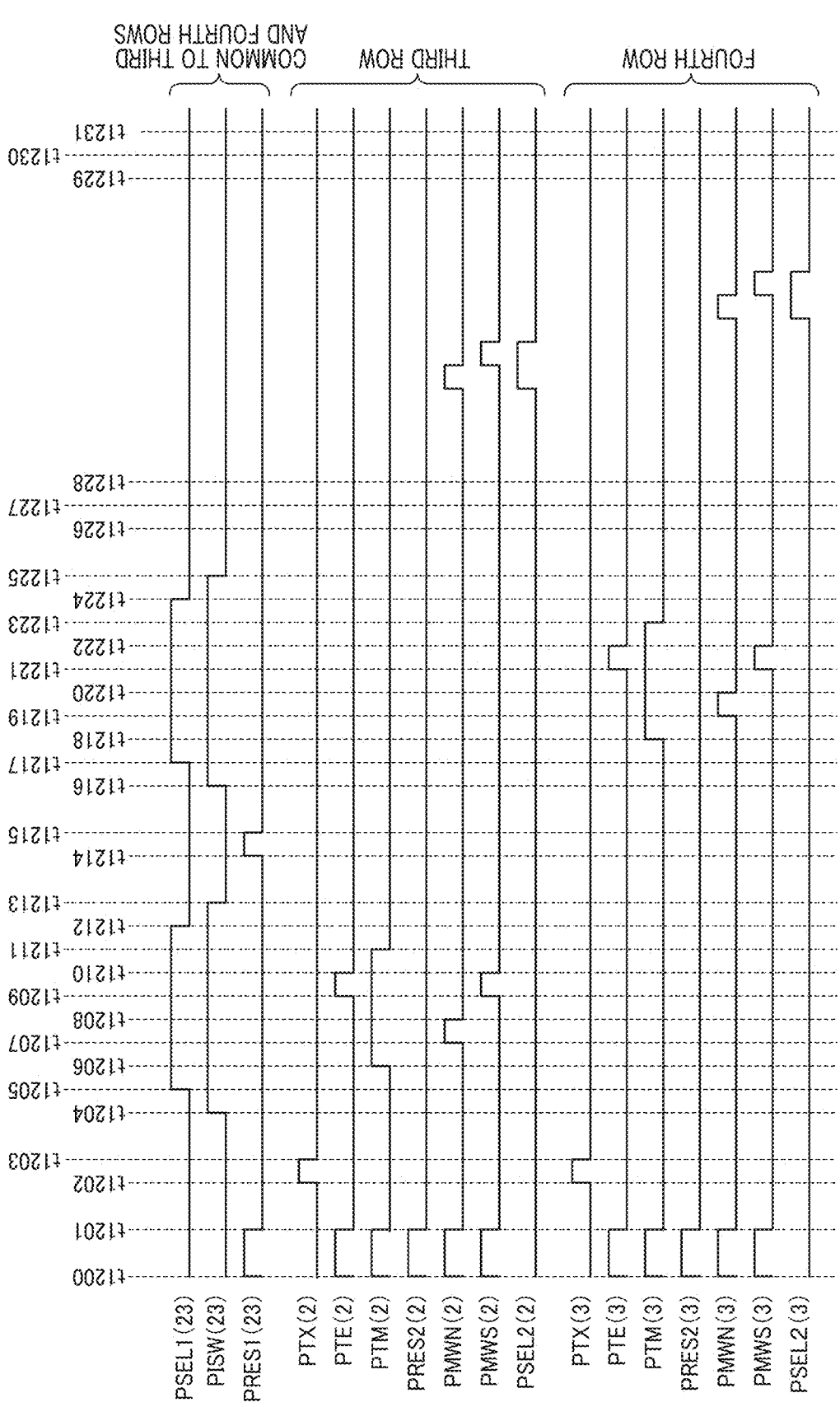
FIG. 17 is a timing chart showing an example of the driving method related to the third embodiment of the imaging element 2.
Figure 18:
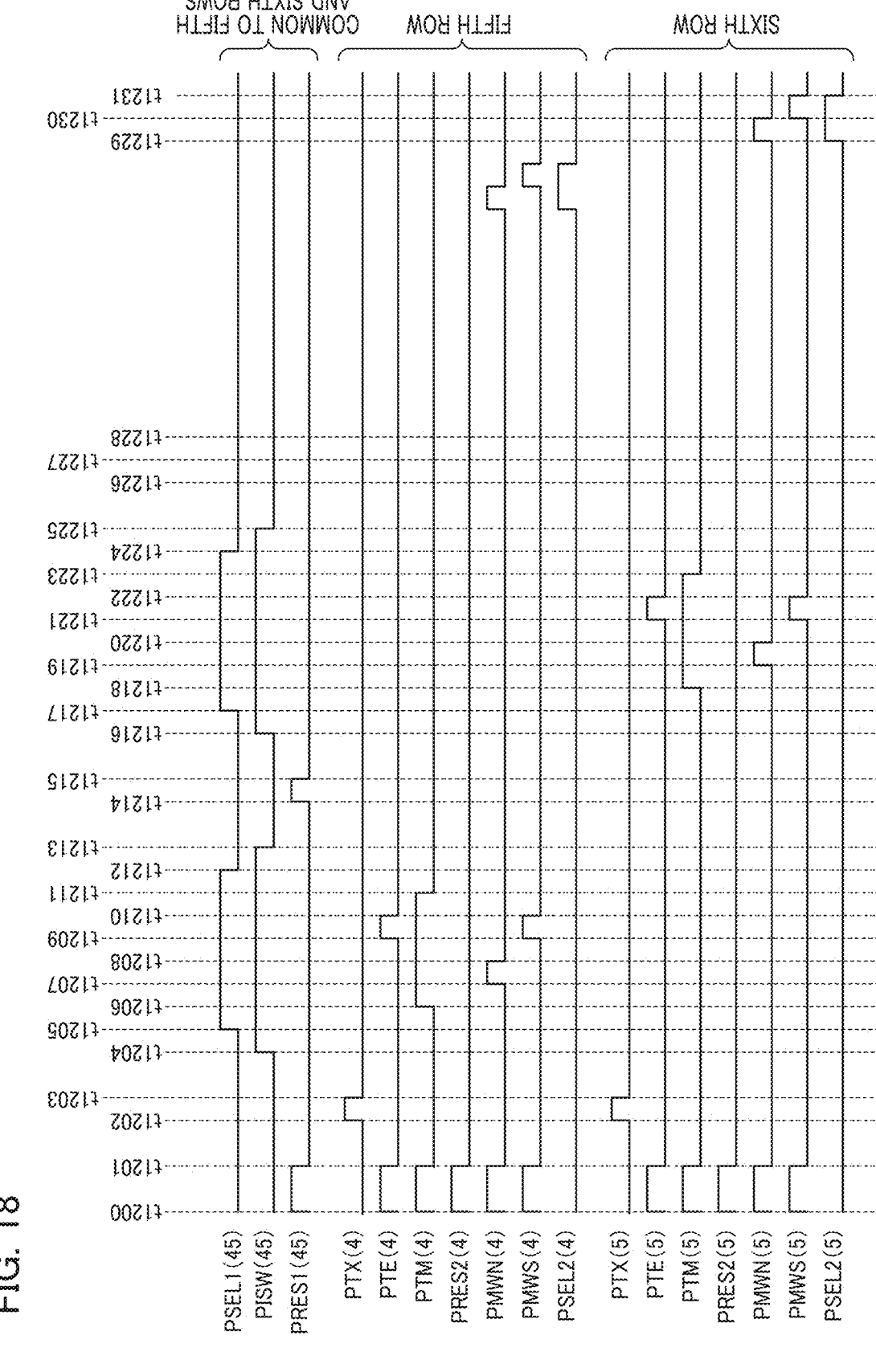
FIG. 18 is a timing chart showing an example of the driving method related to the third embodiment of the imaging element 2.

Next, a driving method related to the third embodiment of the imaging element 2 will be described. FIGS. 16 to 18 are timing charts showing examples of the driving method related to the third embodiment of the imaging element 2. FIG. 16 is a timing chart of pixels in the first and second rows, FIG. 17 is a timing chart of pixels in third and fourth rows, and FIG. 18 is a timing chart of pixels in fifth and sixth rows.

Each pulse is applied to the gate of each of the transistors, and when it is Hi (High), the transistor is turned on, and when it is Lo (Low), the transistor is turned off. The parentheses in the pulse name correspond to the row numbers in the above-described schematic diagram.

Since the selection transistor SEL1 and the current source switch ISW are shared by two pixels, the respective pulses PSEL1 and PISW are shown as follows.

The pulses shared by the first and second rows are set to PSEL1 (01) and PISW (01). The pulses shared by the third and fourth rows are set to PSEL1 (23) and PISW (23). The pulses shared by the fifth and sixth rows are set to PSEL1 (45) and PISW (45).

From time t1202 to time t1225, there is a global electronic shutter operation in which the voltage signal corresponding to the signal charge of each pixel of the first frame is simultaneously transferred to the corresponding laminated circuit 12 of the laminated substrate for all pixels.

Furthermore, a period from time t1225 to time t1231 is a scanning period for sequentially reading out the laminated circuits 12 (0q) present in the first row of the laminated substrate to the laminated circuits 12 (5q) present in the sixth row.

First, from time t1200 to time t1201, PRES1 (01, 23, 45), PTE (0 to 5), PTM (0 to 5), PRES2 (0 to 5), PMWS (0 to 5), and PWMN (0 to 5) are set to Hi. Thus, the charge holding capacitors MEM and FD and the voltage holding capacitors CS and CN are reset.

By setting PTX (0 to 5) to Hi at time t1202 and setting PTX (0 to 5) to Lo at time t1203, the charges accumulated in the PD 10 are transferred to the charge holding capacitor MEM for all pixels at once.

Subsequently, at time t1204, PISW (01, 23, 45) is set to Hi, and the current source I1 is connected to the source side of SEL1.

Next, at time t1205, PSEL1 (01, 23, 45) is set to Hi, and readout of the pixel to be read first among the shared two pixels is started. Next, at time t1206, PTM (0, 2, 4) is set to Hi, at time t1207, PMWN (0, 2, 4) is set to Hi, and at time t1208, PMWN (0, 2, 4) is set to Lo.

Due to this operation, the N signal is written into the voltage holding capacitor CN of the laminated circuit 12 (pq) as the voltage after the reset of the FD is released in the first, third, and fifth rows. Subsequently, at time t1209, PTE (0, 2, 4) and PMWS (0, 2, 4) become Hi, and at time t1210, PTE (0, 2, 4) and PMWS (0, 2, 4) become Lo.

Due to this operation, the charges accumulated in the charge holding capacitors MEM in the first, third, and fifth rows are transferred to the FD, and the voltage (the S signal) of the FD that varies according to the signal charge is written into the voltage holding capacitor CS.

PTM (0, 2, 4) is set to Lo at time t1211 after the transfer is completed, and PSEL1 (01, 23, 45) is set to Lo at time t1212 after the readout of the first, third, and fifth rows is completed. Subsequently, at time t1213, PISW (01, 23, 45) is set to Lo, and the current source I1 is disconnected from the source side of SEL1.

Next, the operation moves on to a readout operation of the pixel to be read out later among the two shared pixels. At time t1214, PRES1 (01, 23, 45) is set to Hi, and at time t1215, PRES1 (01, 23, 45) is set to Lo. Thus, the charge accumulated in the FD is reset. Subsequently, at time t1216, PISW (01, 23, 45) is set to Hi, and the current source I1 is connected to the source side of SEL1.

Next, at time t1217, PSEL1 (01, 23, 45) is set to Hi, and the readout of the pixel to be read out later among the two shared pixels is started. Next, PTM (1, 3, 5) becomes Hi at time t1218, PMWN (1, 3, 5) becomes Hi at time t1219, and PMWN (1, 3, 5) becomes Lo at time t1220.

Due to this operation, in the second, fourth, and sixth rows, the N signal is written into the voltage holding capacitor CN of the laminated circuit 12 (pq) as the voltage after the reset of the FD is released. Subsequently, at time t1221, PTE (1, 3, 5) and PMWS (1, 3, 5) become Hi, and at time t1222, PTE (1, 3, 5) and PMWS (1, 3, 5) become Lo.

Due to this operation, the charges accumulated in the charge holding capacitors MEM in the second, fourth, and sixth rows are transferred to the FD, and the voltage (the S signal) of the FD that varies according to the signal charge is written into the voltage holding capacitor CS.

PTM (1, 3, 5) is set to Lo at time t1223 after the transfer is completed, and PSEL1 (01, 23, 45) is set to Lo at time t1224 after the readout of the second, fourth, and sixth lines is completed. Subsequently, at time t1225, PISW (01, 23, 45) is set to Lo, and the current source I1 is disconnected from the source side of SEL1.

From time t1226 to time t1228, the signal in the first row is read out. From time t1226 to time t1231, regarding the readout operation of each row, the transfer of the N signal to the vertical output line, the AD conversion of the N signal, transfer of the S signal, and the AD conversion of the S signal are sequentially performed for each row.

Since this operation is similar to the operation from time t624 to time t632 in the first embodiment, the description thereof will be omitted.

In the third embodiment, by transferring the charges accumulated in the PD 10 to the charge holding capacitor MEM different from the FD all at once, in the imaging device A, the transfer unit from the FD to the voltage holding capacitors CN and CS is shared by a plurality of pixels, while globality is maintained.

Thus, while the circuit configuration is reduced, it is possible to reduce the peak power of the imaging device A by half compared to when all pixels of the imaging device A are simultaneously transferred to the voltage holding capacitors CN and CS.

In the third embodiment, the amplification transistor (the source follower unit) SF1 is shared by two pixels. The present invention is not limited thereto, and a plurality of pixels may share the source follower unit. Furthermore, in the third embodiment, regarding the transfer from the FD to the voltage holding capacitor CS, the first, third, and fifth rows and the second, fourth, and sixth rows are simultaneously read out.

However, the present invention is not limited thereto, and for example, the first, third, and fifth rows may be first divided and read out in row order, and then the second, fourth, and sixth rows may be divided and read out in row order. Thus, although a readout time increases, it is also possible to further reduce the peak power.

Fourth Embodiment

[Imaging Device]

A fourth embodiment uses a driving method that shortens a period during which the FD holds charges in the configuration of the first embodiment. Thus, it is possible to reduce the peak power of the imaging element 2 and also to reduce deterioration of the image quality. Description of the same configuration as in the first embodiment will be omitted.

[Imaging Method]

Next, a method of driving the fourth embodiment of the imaging element 2 will be described. FIGS. 20 to 25 are timing charts showing examples of the driving method related to the fourth embodiment of the imaging element 2, and FIGS. 20 to 25 are timing charts for pixels in the first to sixth rows, respectively.

Each pulse is applied to the gate of each of the transistors, and when it is Hi (High), the transistor is turned on, and when it is Lo (Low), the transistor is turned off. The parentheses in the pulse name correspond to the row numbers in the above-described schematic diagram.

From time t2002 to time t2021, there is a global electronic shutter operation in which the voltage signal corresponding to the signal charge of each pixel of the first frame is simultaneously transferred to the corresponding laminated circuit 12 of the laminated substrate 22 for all pixels.

Furthermore, a period from time t2022 to time t2031 is a scanning period for sequentially reading out the laminated circuits 12 (0q) present in the first row of the laminated substrate 22 to the laminated circuits 12 (5q) present in the sixth row.

First, from time t2000 to time t2001, PRES1 (0 to 5), PRES2 (0 to 5), PMWS (0 to 5), and PWMN (0 to 5) are set to Hi to reset the FD and voltage holding capacitors CS and CN.

At time t2002, PISW (0) is set to Hi, and the current source I1 for the pixels in the first row is connected to the source side of SEL1.

Furthermore, by setting PSEL1 (0) and PMWN (0) to Hi at time t2003 and setting PWMN (0) to Lo at time t2004, the N signal is written into the voltage holding capacitor CN of the laminated circuit 12 (pq) as the voltage after the reset of the FD is released.

Then, PSEL1 (0) is set to Lo, PISW (0) is set to Lo at time t2005, and current source I1 in the first row is disconnected from SEL1.

Next, as an operation in the second row, at time t2003, PISW (1) is set to Hi, and the current source I1 for pixels in the second row is connected to the source side of SEL1.

Next, by setting PSEL1 (1) and PMWN (1) to Hi at time t2004 and setting PWMN (1) to Lo at time t2005, the N signal is written into the voltage holding capacitor CN of the laminated circuit 12 (pq) as the voltage after the reset of the FD is released.

Then, PSEL1 (1) is set to Lo, PISW (1) is set to Lo at time t2006, and the current source I1 in the second row is disconnected from SEL1.

Next, as an operation in the third row, at time t2004, PISW (2) is set to Hi, and the current source I1 for the pixels in the second row is connected to the source side of SEL1.

Next, by setting PSEL1 (2) and PMWN (2) to Hi at time t2005 and setting PWMN (2) to Lo at time t2006, the N signal is written into the voltage holding capacitor CN of the laminated circuit 12 (pq) as the voltage after the reset of the FD is released.

Then, PSEL1 (2) is set to Lo, PISW (2) is set to Lo at time t2007, and the current source I1 in the third row is disconnected from SEL1.

Next, as an operation in the fourth row, at time t2005, PISW (3) is set to Hi, and the current source I1 for the pixels in the second row is connected to the source side of SEL1.

Next, by setting PSEL1 (3) and PMWN (3) to Hi at time t2006 and setting PWMN (3) to Lo at time t2007, the N signal is written into the voltage holding capacitor CN of the laminated circuit 12 (pq) as the voltage after the reset of the FD is released.

Then, PSEL1 (3) is set to Lo, PISW (3) is set to Lo at time t2008, and the current source I1 in the fourth row is disconnected from SEL1.

Next, as an operation in the fifth row, at time t2006, PISW (4) is set to Hi, and the current source I1 for the pixels in the second row is connected to the source side of SEL1.

Next, by setting PSEL1 (4) and PMWN (4) to Hi at time t2007 and setting PWMN (4) to Lo at time t2008, the N signal is written into the voltage holding capacitor CN of the laminated circuit 12 (pq) as the voltage after the reset of the FD is released.

Then, PSEL1 (4) is set to Lo, and PISW (4) is set to Lo at time t2009, and the current source I1 in the fifth row is disconnected from SEL1.

Next, as an operation in the sixth row, at time t2007, PISW (5) is set to Hi, and the current source I1 for the pixels in the second row is connected to the source side of SEL1.

Next, by setting PSEL1 (5) and PMWN (5) to Hi at time t2008 and setting PWMN (5) to Lo at time t2009, the N signal is written into the voltage holding capacitor CN of the laminated circuit 12 (pq) as the voltage after the reset of the FD is released.

Then, PSEL1 (5) is set to Lo, PISW (5) is set to Lo at time t20010, and the current source I1 in the sixth row is disconnected from SEL1.

In this way, when the N signal is transferred to the voltage holding capacitor CN row by row, it is possible to shorten a period during which transfer of all rows is completed by overlapping some control periods.

That is, for example, if the charge accumulated in the charge holding unit in the first row after the reset of the FD is released is a first charge, a first transfer period during which a voltage signal (an N signal) according to the first charge is transferred to the voltage holding unit is from t2002 to t2005.

Further, if the charge accumulated in the second row charge holding unit after the reset of the FD is released is a second charge, a second transfer period during which a voltage signal according to the second charge is transferred to the voltage holding unit is from t2003 to t2006. Thus, in this embodiment, the second transfer period is started before the first transfer period is completed.

Next, at time t2011, PTX (0 to 5) becomes Hi, and at time t2012, PTX (0 to 5) becomes Lo, and thus the charges accumulated in the PD 10 are transferred to the FD for all pixels at once.

Next, at time t2013, PISW (0) is set to Hi, and the current source I1 for the pixels in the first row is connected to the source side of SEL1. Next, by setting PSEL1 (0) and PMWS (0) to Hi at time t2014 and setting PWMS (0) to Lo at time t2015, the voltage (the S signal) of the first row FD that varies according to the signal charge of the PD 10 is written into the voltage holding capacitor CS.

Then, PSEL1 (0) is set to Lo, PISW (0) is set to Lo at time t2016, and the current source I1 in the first row is disconnected from SEL1.

Next, as the second row operation, at time t2014, PISW (1) is set to Hi, and the current source I1 for pixels in the second row is connected to the source side of SEL1.

Next, the voltage (the S signal) of the FD in the second row is written into the voltage holding capacitor CSV by setting PSEL1 (1) and PMWN (1) to Hi at time t2015 and setting PWMN (1) to Lo at time t2016.

Then, PSEL1 (1) is set to Lo, PISW (1) is set to Lo at time t2017, and the current source I1 in the second row is disconnected from the source side of SEL1.

Next, as an operation in the third row, at time t2015, PISW (2) is set to Hi, and the current source I1 for the pixels in third row is connected to the source side of SEL1.

Next, the voltage (the S signal) of the FD in the third row is written into the voltage holding capacitor CS by setting PSEL1 (2) and PMWN (2) to Hi at time t2016 and setting PWMN (2) to Lo at time t2017.

Then, PSEL1 (2) is set to Lo, PISW (2) is set to Lo at time t2018, and the current source I1 in the third row is disconnected from the source side of SEL1.

Next, as an operation in the fourth row, at time t2016, PISW (3) is set to Hi, and the current source I1 for the pixels in the fourth row is connected to the source side of SEL1.

Next, the voltage (the S signal) of the FD in the fourth row is written into the voltage holding capacitor CS by setting PSEL1 (3) and PMWN (3) to Hi at time t2017 and setting PWMN (3) to Lo at time t2018.

Then, PSEL1 (3) is set to Lo, PISW (3) is set to Lo at time t2019, and the current source I1 in the fourth row is disconnected from the source side of SEL1.

Next, as an operation in the fifth row, at time t2017, PISW (4) is set to Hi, and the current source I1 for the pixels in fifth row is connected to the source side of SEL1.

Next, the voltage (the S signal) of the FD in the fifth row is written into the voltage holding capacitor CS by setting PSEL1 (4) and PMWN (4) to Hi at time t2018 and setting PWMN (4) to Lo at time t2019.

Then, PSEL1 (4) is set to Lo, PISW (4) is set to Lo at time t2020, and the current source I1 in the fifth row is disconnected from the source side of SEL1.

Next, as an operation in the sixth row, at time t2018, PISW (5) is set to Hi, and the current source I1 for the pixels in the sixth row is connected to the source side of SEL1.

Next, the voltage (the S signal) of the FD in the sixth row is written into the voltage holding capacitor CS by setting PSEL1 (5) and PMWN (5) to Hi at time t2019 and setting PWMN (5) to Lo at time t2020.

Then, PSEL1 (5) is set to Lo, PISW (5) is set to Lo at time t2021, and the current source I1 in the sixth row is disconnected from the source side of SEL1.

In this way, when the S signal is transferred to the voltage holding capacitor CS row by row, it is possible to shorten the period during which transfer of all rows is completed by overlapping some control periods.

That is, for example, if the signal charge accumulated in the charge holding unit in the first row is a first charge, a first transfer period during which a voltage signal (an S signal) according to the first charge is transferred to the voltage holding unit is from t2013 to t2016.

Furthermore, if the charge accumulated in the charge holding unit in the second row after the reset of the FD is released is a second charge, a second transfer period in which a voltage signal (an S signal) according to the second charge is transferred to the voltage holding unit is from t2014 to t2017. In this way, the second transfer period for the S signal also starts before the first transfer period is completed.

In this way, in the fourth embodiment, it is possible to curb the peak current flowing through the amplification transistor SF1 while globality is maintained, and it is also possible to prevent deterioration of image quality.

Next, from time t2022 to time t2024, the signal in the first row is read out. From time t2022 to time t2031, regarding the readout operation of each row, the transfer of the N signal to the vertical output line, the AD conversion of the N signal, the transfer of the S signal, and the AD conversion of the S signal are sequentially performed for each row. This operation is similar to the operation from time t624 to time t632 in the first embodiment, and thus the description thereof will be omitted.

In this way, in the fourth embodiment, in order to shorten the transfer period from the FD to the voltage holding capacitor when the charges transferred to the FD all at once are transferred from the FD to the voltage holding capacitor, control for each row partially overlaps.

In this way, in the fourth embodiment, since the charge holding period in the FD can be further shortened by partially overlapping row-by-row control while globality is maintained and the peak power of the imaging element 2 is reduced, it is possible to prevent deterioration of image quality more than in the first embodiment.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the imaging element or the like through a network or various storage media. Then, a computer (or a CPU, an MPU, or the like) of the imaging element or the like may be configured to read and execute the program. In such a case, the program and the storage medium storing the program configure the present invention.

In addition, the present invention includes those realized using at least one processor or circuit configured to perform functions of the embodiments described above. For example, a plurality of processors may be used for distribution processing to perform functions of the embodiments described above.

This application claims the benefit of priority from Japanese Patent Application No. 2023-113470, filed on Jul. 11, 2023, and Japanese Patent Application No. 2024-70471, filed on Apr. 24, 2024, both of which are hereby incorporated by reference herein in its entirety.

What is claimed is:

1. An imaging element comprising:

a plurality of pixels arranged in a two-dimensional manner, wherein each pixel has a photoelectric conversion unit, a charge holding unit configured to accumulate charges generated in the photoelectric conversion unit, and a transfer switch configured to transfer charges generated in the photoelectric conversion unit to the charge holding unit;

a plurality of voltage holding units arranged in a two-dimensional manner, wherein each voltage holding unit is configured to hold a voltage signal according to the charges of the charge holding unit;

a plurality of selection switches configured to transfer the voltage signals held in the plurality of voltage holding units to vertical signal lines;

a source follower unit configured to transfer the voltage signal to the voltage holding unit;

a current source configured to drive the source follower unit;

a current source switch configured to selectively connect the source follower unit and the current source; and at least one processor; and a memory coupled to the at least one processor, the memory storing instructions that, when executed by the at least one processor, cause the at least one processor to:

transfer the charges generated in the photoelectric conversion unit to the charge holding unit all at once by the transfer switch, sequentially connect the source follower unit and the current source by the current source switch to sequentially transfer the voltage signal according to the charges accumulated in the charge holding unit to the voltage holding unit arranged in the two-dimensional manner, and then sequentially transfer the voltage signals held in the plurality of voltage holding units arranged in the two-dimensional manner to corresponding vertical signal line by the plurality of selection switches.

2. The imaging element according to claim 1, wherein the voltage holding unit is provided for each of the pixels.

3. The imaging element according to claim 1, wherein the voltage signals according to the charge accumulated in the charge holding unit are sequentially transferred row by row in a matrix arrangement of the pixels.

4. The imaging element according to claim 1, wherein the voltage signals according to the charges accumulated in the charge holding unit in each predetermined region in a matrix arrangement of the pixels are sequentially transferred.

5. The imaging element according to claim 1, wherein the source follower unit is shared by a plurality of the pixels.

6. The imaging element according to claim 1, further comprising an AD conversion unit configured to convert the voltage signal into a digital signal, wherein the AD conversion unit sequentially converts the voltage signal held in the voltage holding unit into the digital signal.

7. The imaging element according to claim 1, wherein a first transfer period in which the voltage signal according to a first charge accumulated in the charge holding unit is transferred to the voltage holding unit and a second transfer period in which the voltage signal according to a second charge accumulated in the charge holding unit is transferred to the voltage holding unit are controlled, and the second transfer period is started before the first transfer period is completed.

8. A method for controlling an imaging element which comprises a plurality of pixels arranged in a two-dimensional manner, wherein each pixel has a photoelectric conversion unit, a charge holding unit configured to accumulate charges generated in the photoelectric conversion unit, and a transfer switch configured to transfer charges generated in the photoelectric conversion unit to the charge holding unit, a plurality of voltage holding units arranged in a two-dimensional manner, wherein each voltage holding unit is configured to hold a voltage signal according to the charges of the charge holding unit, a plurality of selection switches configured to transfer the voltage signals held in the plurality of voltage holding units to vertical signal lines, a source follower unit configured to transfer the voltage signal to the voltage holding unit, a current source configured to drive the source follower unit, and a current source switch configured to selectively connect the source follower unit and the current source, the method comprising:

transferring the charges generated in the photoelectric conversion unit to the charge holding unit all at once by the transfer switch;

sequentially connecting the source follower unit and the current source by the current source switch to sequentially transfer the voltage signal according to the charges accumulated in the charge holding unit to the voltage holding unit arranged in the two-dimensional manner, and then sequentially transferring the voltage signals held in the plurality of voltage holding units arranged in the two-dimensional manner to corresponding vertical signal line by the plurality of selection switches.

9. A non-transitory computer-readable storage medium configured to store a computer program for an imaging element wherein the imaging element comprises a plurality of pixels arranged in a two-dimensional manner, wherein each pixel has a photoelectric conversion unit, a charge holding unit configured to accumulate charges generated in the photoelectric conversion unit, and a transfer switch configured to transfer charges generated in the photoelectric conversion unit to the charge holding unit, a plurality of voltage holding units arranged in a two-dimensional manner, wherein each voltage holding unit is configured to hold a voltage signal according to the charges of the charge holding unit, a plurality of selection switches configured to transfer the voltage signals held in the plurality of voltage holding units to vertical signal lines; a source follower unit configured to transfer the voltage signal to the voltage holding unit, a current source configured to drive the source follower unit, and a current source switch configured to selectively connect the source follower unit and the current source;

wherein the computer program comprises instructions for executing following processes:

transferring the charges generated in the photoelectric conversion unit to the charge holding unit all at once by the transfer switch; and sequentially connecting the source follower unit and the current source by the current source switch to sequentially transfer the voltage signal according to the charges accumulated in the charge holding unit to the voltage holding unit arranged in the two-dimensional manner, and then sequentially transferring the voltage signals held in the plurality of voltage holding units arranged in the two-dimensional manner to corresponding vertical signal line by the plurality of selection switches.

\* \* \* \* \*